(12) United States Patent
Anand et al.

(10) Patent No.: US 11,159,614 B2
(45) Date of Patent: Oct. 26, 2021

(54) METHOD AND APPARATUS FOR MANAGING DATA IN A NETWORK BASED ON SWARM INTELLIGENCE

(71) Applicant: Samsung Electronics Co., Ltd., Suwon-si (KR)

(72) Inventors: Himanshu Anand, Noida (IN); Nikhil Bisht, Noida (IN); Ayush Pratap Singh, Noida (IN); Ankit Jalota, Noida (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/750,463

(22) Filed: Jan. 23, 2020

(65) Prior Publication Data
US 2020/0236164 A1 Jul. 23, 2020

(30) Foreign Application Priority Data

Jan. 23, 2019 (IN) .............................. 201911002834

(51) Int. Cl.
*H04L 29/08* (2006.01)
(52) U.S. Cl.
CPC ...... *H04L 67/1085* (2013.01); *H04L 67/1051* (2013.01); *H04L 67/322* (2013.01); *H04L 67/06* (2013.01)
(58) Field of Classification Search
CPC ............. H04L 67/1085; H04L 67/1051; H04L 67/322; H04L 67/06; H04L 41/12
See application file for complete search history.

(56) References Cited

U.S. PATENT DOCUMENTS

| | | | |
|---|---|---|---|
| 6,339,785 B1 | 1/2002 | Feigenbaum | |
| 8,639,831 B2 | 1/2014 | Painter et al. | |
| 8,719,376 B2 | 5/2014 | Paleja et al. | |
| 8,898,255 B2 | 11/2014 | Kim et al. | |
| 9,407,693 B2 | 8/2016 | Singhal et al. | |
| 9,794,122 B2 | 10/2017 | Park et al. | |

(Continued)

FOREIGN PATENT DOCUMENTS

| | | |
|---|---|---|
| KR | 10-2017-0035706 A | 3/2017 |
| KR | 10-2017-0092569 A | 8/2017 |

(Continued)

OTHER PUBLICATIONS

Indian Office Action dated Aug. 5, 2020, issued in Indian Application No. 201911002834.

(Continued)

*Primary Examiner* — Philip C Lee
(74) *Attorney, Agent, or Firm* — Jefferson IP Law, LLP

(57) ABSTRACT

An apparatus for managing data in a network is provided. The apparatus includes a memory, and a processor configured to identify a first leader device and a second leader device in a swarm comprising a plurality of devices based device parameters, receive a request for downloading data, download, as the first leader device, the data from a content device in response to the request, store the downloaded data to the memory, transmit the data to the second leader device, and divide the swarm into a first sub swarm comprising the first leader device and a second sub swarm comprising the second leader device.

17 Claims, 20 Drawing Sheets

(56) References Cited

U.S. PATENT DOCUMENTS

| | | |
|---|---|---|
| 10,911,337 B1* | 2/2021 | De Kosnik .......... H04L 67/1051 |
| 2002/0059400 A1 | 5/2002 | Ikami et al. |
| 2002/0178261 A1 | 11/2002 | Chang et al. |
| 2007/0136133 A1 | 6/2007 | Li |
| 2010/0169442 A1 | 7/2010 | Liu et al. |
| 2011/0128889 A1* | 6/2011 | Liao ..................... H04L 67/1051 |
| | | 370/255 |
| 2011/0282727 A1 | 11/2011 | Phan et al. |
| 2013/0123981 A1* | 5/2013 | Lee ........................ H04W 4/029 |
| | | 700/248 |
| 2014/0025728 A1 | 1/2014 | Chopra et al. |
| 2016/0255143 A1* | 9/2016 | Hunt ................... H04L 67/1072 |
| | | 709/226 |
| 2018/0091587 A1 | 3/2018 | Akkanen |
| 2018/0248956 A1 | 8/2018 | Kim et al. |
| 2019/0182938 A1 | 6/2019 | Schroder et al. |

FOREIGN PATENT DOCUMENTS

| | | |
|---|---|---|
| KR | 10-2018-0097858 A | 9/2018 |
| TW | 1384812 B | 2/2013 |
| WO | 2016/195910 A1 | 12/2016 |

OTHER PUBLICATIONS

International Search Report dated May 1, 2020, issued in International Patent Application No. PCT/KR2020/001190.
Sanjay K. Dhurandher et al., "A Swarm Intelligence-Based P2P File Sharing Protocol Using Bee Algorithm", IEEE, 2009.

* cited by examiner

METHOD AND APPARATUS FOR MANAGING DATA IN A NETWORK BASED ON SWARM INTELLIGENCE

CROSS-REFERENCE TO RELATED APPLICATION(S)

This application is based on and claims priority under 35 U.S.C. § 119(a) of an Indian patent application number 201911002834 (CS), filed on Jan. 23, 2019, in the Indian Intellectual Property Office, the disclosure of which is incorporated by reference herein in its entirety.

BACKGROUND

1. Field

The disclosure relates to swarm intelligence. More particularly, the disclosure relates to a method and an apparatus for managing data in a network using swarm intelligence

2. Description of Related Art

It may be desirable for a device to rapidly access data files located on a server. High-quality access to data over a network may require the ability to download data as fast as possible. When the data has to be downloaded to a group of devices, there are many challenges. For example, the data should be downloaded to each of the devices sequentially, which brings about the inefficiency in a download speed. Further, if the data or content have multiple parts, each of the multiple part must be downloaded completely before starting the playback. In the aforementioned environment, the user has to spend a large amount of time to reproduce the desired content.

For example, first video content with 50 MB data amount is scheduled to be downloaded and reproduced for 20 hours during a certain day and second video content with 2 GB data amount is scheduled to be downloaded and reproduced for 1 hour during the same day. In such a case, even if the first video content is downloaded and is ready for reproduction, the playback device will wait till the second video content to get downloaded completely to start the reproduction schedule. This is a classic example of an inefficient download and playback system.

Further, the downloading time of the content may increase when a large number of devices are present in the environment and wait for the content to be downloaded to each of the devices. Moreover, when the network capability is low, the user has to spend an unnecessary amount of time to replicate or transmit the desired content. Additionally, the user may also find that there is an error during the content downloading or the solution between a client device and a server is not working properly. Further, the network bandwidth during the downloading is also an important factor in such scenario. Often times, the content downloading process may fail because of the low network bandwidth when the user requests downloading the content simultaneously to a large number of devices—e.g. 100 devices—in a particular group. As the network bandwidth may be low, many devices in the group may not be able to download the contents properly.

In view of the above deficiencies mentioned in the content download approach, there needs a technical solution to optimize the download speed and to reduce the data consumption during distribution of content to group of devices with limited network bandwidth.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an efficient data management—downloading and distributing data in a network using swarm intelligence.

Another aspect of the disclosure is to provide an apparatus and method for managing content in a client-server arrangement.

Additional aspects will be set forth in part in the description which follows and, in part, will be apparent from the description, or may be learned by practice of the presented embodiments.

In accordance with an aspect of the disclosure, a method of managing content in a network is provided. The method includes identifying a first leader device and a second leader device in a swarm comprising a plurality of devices based device parameters of the plurality of devices, receiving a request for downloading data, downloading, by the first leader device, the data from the server in response to the request, transmitting, by the first leader device, the data to the second leader device, and dividing the swarm into a first sub swarm comprising the first leader device and a second sub swarm comprising the second leader device.

In an embodiment, the second leader device transmits the received data to at least one device included in the second sub swarm.

In an embodiment, upon the transmitting of the data by the first leader device to the second leader device, the second sub swarm is divided into a third sub swarm comprising the second leader device and a fourth sub swarm comprising the at least one device of the plurality of devices.

In an embodiment, the method further includes determining the swarm comprising the plurality of devices in the network based on behavior characteristics of the plurality of devices.

In an embodiment, the determining of the swarm of the plurality of devices in the network includes detecting the behavior characteristics of the plurality of devices, generating information on the behavior characteristics for each of the plurality of devices, and broadcasting the information on the behavior characteristics over the network.

In an embodiment, the behavior characteristics of the plurality of devices includes at least one of identification number of the devices, firmware identification in the devices, group identification to which the devices belong, or service set identifier (SSID) of the devices.

In an embodiment, the device parameters include at least one of ping response time of the devices, bandwidth of the devices, or memory capacity of the devices.

In an embodiment, the identifying of the first leader device and the second leader device is based on a priority of the one or more device parameters associated with the plurality of devices.

In an embodiment, the method further includes determining the priority of the device parameters based on at least one of ping response time of the devices, CPU capacity of the devices, bandwidth of the devices, or memory capacity of the devices.

In an embodiment, the method further includes detecting a change in a swarm formation parameter, disjoining a selected device from the swarm in response to the detecting of the change in the swarm formation parameter, and joining the selected device to another swarm.

In an embodiment, the swarm formation parameter includes at least one of software version of the first leader device or firmware version of the first leader device.

In an embodiment, the method further includes detecting an event in the swarm.

In an embodiment, the event includes at least one of an existence of two or more leader devices in the swarm, a change of the parameter chosen for generating the swarm or for choosing at least one leader device, a completion of the transmission of the data at the second leader device, or a request of data by a device during runtime in the swarm.

In an embodiment, the method further includes in response to the detecting of the event, based on an event type of the event, joining to another swarm or generating a sub swarm from the swarm, and controlling to select a new leader device in the sub swarm when the sub swarm is generated, wherein the number of devices in the sub swarm is smaller than the number of devices in the swarm, when the sub swarm is generated.

In an embodiment, the data comprises content and schedule data which instructs each of the devices in the swarm to display a part of the content based on location of each of the devices in the swarm.

In an embodiment, the schedule data further include time information related to the content if the content is a moving picture.

In accordance with another aspect of the disclosure, a method of managing data in a network is provided. The method includes determining a swarm comprising a plurality of devices in the network based on behavior characteristics of the plurality of devices, receiving a request for data from a requesting device in the swarm, determining whether the data is available, and notifying, if the data is unavailable, a second device, included in the swarm, containing the data to transmit the data to the requesting device.

In an embodiment, the method further includes determining the second leader device as a first leader device in the swarm.

In an embodiment, the swarm is divided, upon the transmitting of the data, into a first sub swarm including the second device and a second sub swarm including the requesting device.

In accordance with another aspect of the disclosure, an apparatus for managing data in a network is provided. The apparatus includes a memory, and a processor configured to identify a first leader device and a second leader device from among a plurality of devices in a swarm comprising the plurality of devices, based device parameters of the plurality of devices, receive a request for downloading data from a server, download, by the first leader device, the data from the server in response to the request, store the downloaded data to the memory, transmit the data to the second leader device, and divide the swarm into a first sub swarm comprising the first leader device and a second sub swarm comprising the second leader device Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

Figure 1:
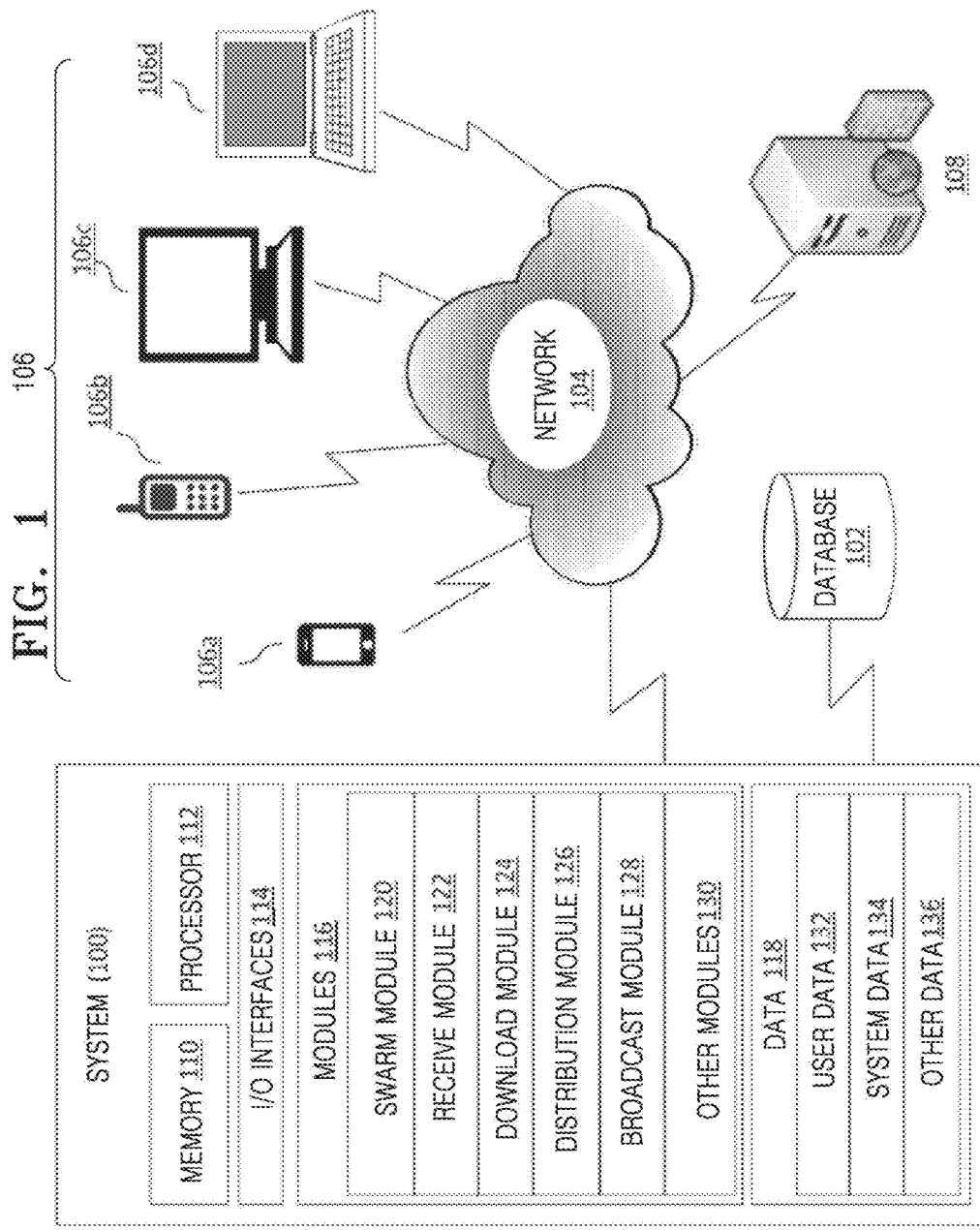
FIG. 1 illustrates a system 100 for managing data in a network, according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As used herein, the terms "1st" or "first" and "2nd" or "second" may use corresponding components regardless of importance or order and are used to distinguish one component from another without limiting the components.

The accompanying drawings are used to help easily understand various technical features and it should be understood that the embodiments presented herein are not limited by the accompanying drawings. As such, the disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Embodiments of the disclosure will be described below in detail with reference to the accompanying drawings.

The various embodiments herein may include one or more methods and apparatuses for managing data in a network using swarm intelligence. In particular, the managing of data may include rapid downloading and reproduction of content in a client-server arrangement.

In an embodiment, the method includes creating a swarm of a plurality of client devices in a network based on at least one of the behavior or behavioral characteristics of the plurality of client devices in the network. The behavior characteristics of the plurality of devices may include identification number of the devices, firmware identification of the firmware installed in the devices, group identification to which the devices belong, service set identifier (SSID) of the devices and the like. The group identification may include content ID, schedule ID, geographic location and the like. Further, the method includes identifying a first temporary leader—a first leader device—and a second temporary leader—a second leader device—from a created swarm of the plurality of devices in the network based on one or more device parameters. The device parameters of the plurality of devices may include ping response time of each of the devices, CPU capacity such as CPU availability and/or CPU speed, available bandwidth of each of the devices and memory availability—memory capacity of each of the devices. The method may further include receiving a request of downloading content from a server by at least one device in the swarm. The request of downloading content may be received from any of content devices—a device having the content—other than the server. Upon receiving the request, the first temporary leader initiates downloading the content from the server. Furthermore, the content is distributed or transmitted from the first temporary leader to the second temporary leader of the swarm. Upon completion of the content transmission, the swarm is divided into a first sub-swarm including the first temporary leader and a second sub-swarm including the second temporary leader. The both of the first and the second sub-swarms have balanced characteristics in a dynamic manner. In an embodiment, the balanced characteristics may include communication load in swarms, CPU capacity, loads on devices and/or the server, bandwidth of the devices, ping response time between the server and the client devices, and the like.

In an embodiment, a system may include a swarm module configured to generate a swarm of a plurality of devices in a network based on at least one of behavioral characteristics of the plurality of devices. The system may be a system controlling—generating and dividing—the swarm and being located outside the swarm or may be one of the client devices which control—generate and divide—the swarm and is located inside the generated swarm. Further, the swarm module is configured to identify a first temporary leader and a second temporary leader from the created swarm containing the plurality of devices in the network based on one or more device parameters. The device parameters may include ping response time of the devices, bandwidth of the devices, and/or the memory capacity of the devices. The system may also include a receive module configured to receive a request for downloading data such as various contents from the server by at least one device in the swarm. Further, the system may include a download module configured to download the data from the server by the first temporary leader in the swarm. Furthermore, the system may include a distribution module configured to distribute or transmit the data to the second temporary leader of the swarm and then to divide the swarm into a first sub-swarm and a second sub-swarm having balanced characteristics in a dynamic manner.

In another embodiment, the generation of swarm having a plurality of devices further includes detecting the behavioral characteristics of the plurality of devices and generating a unique string for each of the behavioral characteristics of the plurality of devices. The method further includes broadcasting or transmitting the generated unique string for each of the plurality of devices over the network and joining the swarm by one of the plurality of devices after receiving a response from a swarm manager in a predetermined time. Further, the method includes initializing the swarm manager by one of the plurality of devices after the response from the one of the plurality of devices is failed and waiting for other plurality of devices to join the swarm. The swarm manager may be a processor included in each of the plurality of devices.

In an embodiment, the first temporary leader and the second temporary leader are identified based on the device parameters of the plurality of devices and broadcasting the device parameters over the network for achieving consensus. That is to say, a consensus among the plurality of devices is made based on the device parameters the first temporary leader and the second temporary leader may be determined according to the consensus of the plurality of devices. The method further includes identifying the first temporary leader and the second temporary leader in the swarm of the plurality of devices having the first best device parameters and the second best device parameters respectively in the swarm. The first best device parameters may indicate, for example, that if a device 1 among the plurality of devices has the fastest CPU speed and/or the maximum bandwidth, the device 1 has the first best device parameters. The second best device parameters may indicate, for example, that if a device 2 among the plurality of devices has the second fastest CPU speed and/or the second maximum bandwidth, the device 2 has the second best device parameters.

In an embodiment, the downloading of the content is initiated by the first temporary leader upon receiving the request for downloading.

In an embodiment, the identifying of the first temporary leader and the second temporary leader is based on a priority of the device parameters associated with the plurality of devices. The priority of the device parameters associated with the plurality of devices is determined based on the ping response time of each of the plurality of devices, the CPU utilization or CPU capacity (speed, computing capacity, etc.) of each of the plurality of devices, available bandwidth of each of the plurality of devices and the available memory of each of the plurality of devices.

In an embodiment, the method further includes identifying a third temporary leader and a fourth temporary leader in the first sub-swarm and the second sub-swarm respectively. The method further includes downloading the content at the third temporary leader and the fourth temporary leader from the first temporary leader and the second temporary leader respectively and dividing each of the sub-swarms into a plurality of sub-sub-swarms having balanced characteristics.

In an embodiment, the temporary leader for the specific swarm or sub-swarm may have maximum bandwidth while downloading the content.

In an embodiment, the dividing of the plurality of sub-swarms may be repeated until the content is distributed to all of the plurality of devices.

In an embodiment, when the content distribution is completed, each of the plurality of devices becomes a temporary leader. The method further includes generating another swarm of the plurality of devices and identifying one or more temporary leaders from the generated swarm.

In an embodiment, the dividing of the swarm into the plurality of sub-swarms is based on the load balancing mechanism.

In an embodiment, the dividing of the swarm into a plurality of sub-swarms is performed based on a detection of an event in the swarm.

In another embodiment, the event may be determined to take place when more than one temporary leader is detected in the swarm, a change in the device parameters occurs while creating a swarm or identifying a temporary leader, a change in behavioral characteristics of the swarm of devices occurs, an event indicating a completion of the content transmission from the temporary leader to a content receiving device, or content is required by at least one device in the swarm during run time.

In an embodiment, the method further includes detecting at least one of corrupt, missing content among the temporary leaders in a sub-swarm and identifying another temporary leader having the content which is not corrupted.

In an embodiment, the method further includes receiving a new content download request and downloading the content from a server by the identified first temporary leader in the network. The method further includes distributing the content to the second temporary leader from the first temporary leader of the swarm and dividing the swarm into the first sub-swarm containing the first temporary leader and the second sub-swarm containing the second temporary leader. The sub swarms have balanced characteristics in a dynamic manner. Further, load balancing mechanism among the first temporary leader and the second temporary leader is applied to download the content.

FIG. 1 illustrates a system 100 for managing data in a network, according to an embodiment of the disclosure.

Referring to FIG. 1, the system 100 may be a device among a plurality of devices in the network 104. The system 100 may be connected to a database 102, the network 104, a plurality of devices 106 (106a, 106b, 106c, and 106d), and a server 108.

The network 104 interconnects the system 100, the plurality of devices 106 (106a, 106b, 106c, 106d), the database 102, and the server 108. The network 104 may be a wired or a wireless network. Examples of the wired network include, but are not limited to, a Wide Area Network (WAN) or a Local Area Network (LAN), a client-server network, a peer-to-peer network, and so forth. Examples of the wireless network include, but are not limited to, Wi-Fi, a Global System for Mobile communications (GSM) network, and a general Packet Radio Service (GPRS) network, an enhanced data GSM environment (EDGE) network, 802.5 communication networks, Code Division Multiple Access (CDMA) networks, or Bluetooth networks. In an example, the network 104 may be a combination of one or more wired and/or wireless networks.

In an embodiment, the server 108 may include, but are not limited to, a proxy server, a mail server, a web server, an application server, real-time communication server, an FTP server and the like.

In an embodiment, the database 102 may be implemented as, but not limited to, enterprise database, remote database, local database, and the like. Further, the database 102 may be located either within the vicinity of each other or may be located at different geographic locations. Furthermore, the database 102 may be implemented inside or outside the system 100 or the database 102 may be implemented as a single database. Further, the database 102 may reside in each of the plurality of devices 106.

In an embodiment, the plurality of devices 106 may include, but are not limited to, mobile phones (for e.g. a smart phone), Personal Digital Assistants (PDAs), smart TVs, wearable devices (for e.g. smart watches or smart bands), tablet computers, Personal Computers (PCs), laptop computers, display devices, content playing devices, IoT devices, devices on content delivery network (CDN), and the like.

In an embodiment, the system 100 may further include one or more processor(s) 112. The processor 112 may be implemented as one or more microprocessors, microcomputers, microcontrollers, digital signal processors, central processing units, state machines, logic circuitries, and/or any devices that manipulate signals based on operational instructions. Among other capabilities, the processor(s) 112 is configured to fetch and execute computer-readable instructions stored in a memory 110.

The memory 110 may be coupled to the processor 112. The memory 110 can include any computer-readable medium including, for example, volatile memory, such as static random access memory (SRAM), and dynamic random access memory (DRAM), and/or non-volatile memory, such as read only memory (ROM), erasable programmable ROM, flash memories, hard disks, optical disks, and magnetic tapes.

In an embodiment, the system 100 may further include one or more input/output (I/O) interfaces 114 for receiving commands or information from a user and to provide the user with, for example, feedback of received commands and or status information of the system 100.

In an embodiment, the data 118 may include various data pertaining to the operation of the processor 112, and other data 136. The data 118 may serve as a database for storing data which may be processed, received, or generated as a result of the execution of one or more modules in the system 100. Further, the data 118 may broadly include user data 132, a system data 134, and other data 136. The user data 132 may include all the data pertaining to the information to be inputted by the user. The system data 134 may include all other kind of data except the user data 132. The user data 132 and the system data 134 may be stored in the database 102.

Further, the system 100 may include modules 116. The modules 116 may include a swarm module 120, a receive module 122, a download module 124, a distribution module 126, a broadcast module 128 and the other modules 130. The swarm module 120 is used to generate a swarm of the plurality of devices 106 in the network 104 based on at least one of behavioral (or behavior) characteristics of the plurality of devices. Here, the behavioral characteristics of the plurality of devices may include at least one of identification number, firmware identification, group identification to which the devices belong, SSID of the devices and the like. The swarm module 120 is further used to identify a first temporary leader and a second temporary leader from the generated swarm of the plurality of devices 106 in the network 104 based on one or more device parameters. The system 100 also includes a receive module 122 which is used to receive a request for downloading data—e.g. the content from the server 108 by at least one device among the plurality of devices 106. Further, the system 100 may include a download module 124 which is used to download the data from the server 108 by the identified first temporary leader in the network 104. Furthermore, the system 100 may include a distribution module 126 which is used to distribute the data to the second temporary leader of the swarm and then to divide the swarm into a first sub-swarm and a second sub-swarm having balanced characteristics in a dynamic manner Here, the factors of balanced characteristics include CPU utilization, load on the plurality of devices 106 and/or the server 108, bandwidth of the plurality of devices, ping response time between the server 108 and the plurality of devices 106, and the like. The modules 116 also include the other modules 130. The modules 116 may be implemented as software programs or hardware processor. If the modules 116 are implemented as a hardware processor, the modules may be integrated into the processor 112.

The modules 116 also include a broadcast module 128 used to broadcast the data to other devices in swarm. The other modules 130 may also include a load balancing module and a detection module (not shown). The load balancing module may be used to apply load balancing mechanism among the first temporary leader and the second temporary leader to download the data. The detection module may be used to detect at least one of corrupt and/or missing data among the temporary leaders in a sub-swarm.

In an embodiment, the download module 124 may be used to download the data which is initiated at the first temporary leader upon receiving the request for downloading the data.

In an embodiment, the swarm module 120 may be used to identify the first temporary leader and the second temporary leader based on a priority of the device parameters associated with the plurality of devices 106.

In an embodiment, the processor 112 of the system 100 may is configured to divide the swarm into a plurality of sub-swarms until the data is distributed to all of the plurality of devices 106.

In an embodiment, the distribution module 126 may also be used to divide the swarm into a plurality of sub-swarms in a dynamic manner based on the load balancing mechanism. The distribution module 126 may be configured to divide the swarm into a plurality of sub-swarms based on a detection of the event in the swarm.

Figure 2:
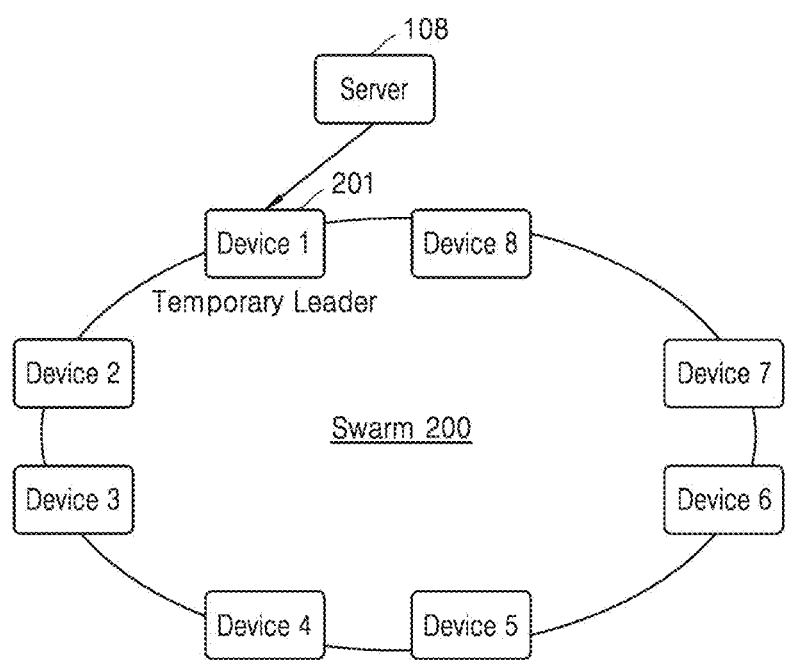
FIG. 2 illustrates a swarm 200 for downloading the content using swarm intelligence, according to an embodiment of the disclosure.

FIG. 2 illustrates a swarm 200 for downloading the content using swarm intelligence, according to an embodiment of the disclosure.

The swarm 200 of the plurality of devices is created for rapid downloading and reproducing of the content in a client-server arrangement.

Referring to FIG. 2, to distribute the content to the eight devices, at least one device—Device 1 is identified and determined as a temporary leader 201—first leader device in the swarm 200—among the eight devices. This temporary leader 201 may download the content from the server 108 with the fastest speed as the bandwidth is not divided among the eight devices. Further, the data consumption is also reduced as only one device, i.e. the temporary leader 201 downloads the content and shares the same with the other seven devices using swarm intelligence. Further, for creating the swarm of the plurality of devices, the behavioral characteristics of the plurality of devices are computed and a unique string for each of the computed behavioral characteristics of the eight devices is generated. The behavioral characteristics of the eight devices may include model number, identification number, firmware identification, unique group identification, SSID and the like. The unique group identification includes content ID, schedule ID, geographic location and the like. The generated unique string for each of the plurality of devices is broadcasted over the network 104. Upon receiving a response from a swarm manager in a predetermined time, at least one of the eight devices will join the swarm 200. If the response from any one of the eight devices is failed, the swarm manager is initialized and the swarm manager may wait for other devices to join the swarm 200.

Figure 3:
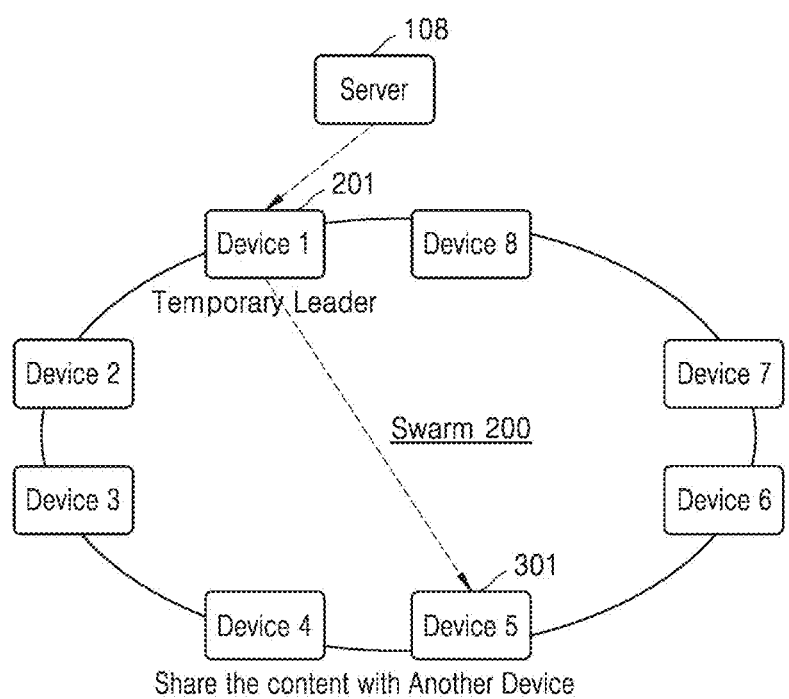
FIG. 3 illustrates a temporary leader sharing the content with another device, according to an embodiment of the disclosure.

FIG. 3 illustrates a temporary leader sharing the content with another device, according to an embodiment of the disclosure. After the content is downloaded by the Device 1 201—first temporary leader or first leader device—from the server 108, the next best temporary leader may be identified.

Referring to FIG. 3, Device 5 301 is identified as the next best temporary leader—the second leader device in the swarm 200. After the content is received by Device 5 301 from Device 1 201, Device 5 301 may declare itself as the available temporary leader. In an embodiment, the next best temporary leader may be identified based on the device parameters of the devices. The device parameters may include ping response time, CPU utilization, available bandwidth and available memory. Further, while identifying the temporary leader and the next best available temporary leader, a priority of the device parameters associated with the devices may be considered. This priority of the device parameters associated with the plurality of devices may be determined on the basis of the ping response time, the CPU utilization, available bandwidth and the available memory of the respective devices.

Figure 4:
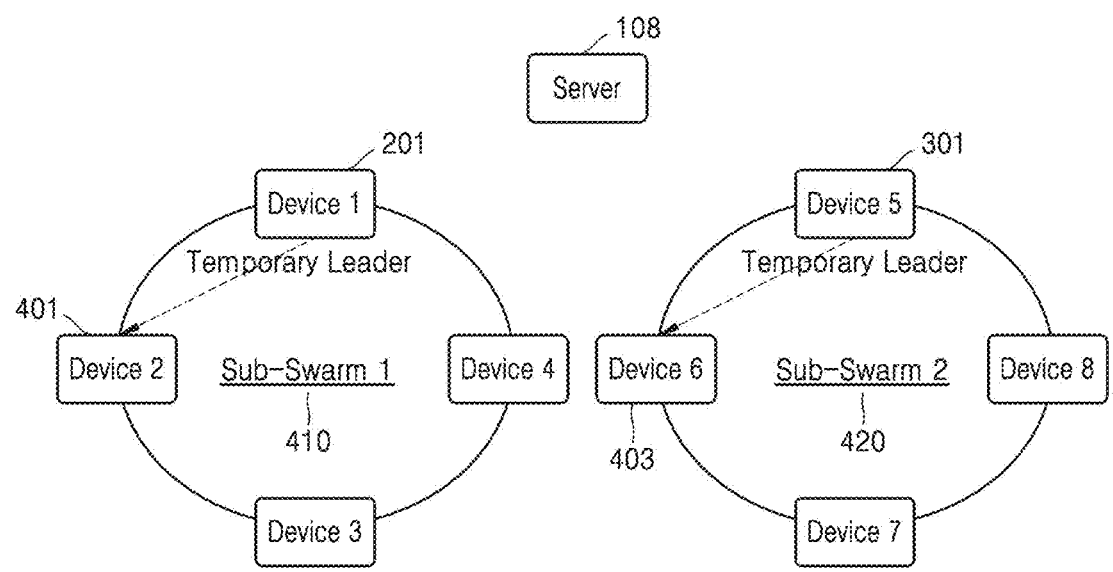
FIG. 4 illustrates dividing the swarm into sub-swarms, according to an embodiment of the disclosure.

FIG. 4 illustrates dividing the swarm into sub-swarms, according to an embodiment of the disclosure.

Once the content is received by Device 5 301, there will be at least two temporary leaders, i.e., Device 1 201 and Device 5 301 in swarm 200.

Referring to FIG. 4, this situation triggers an event in the swarm 200 which results in the breaking of the swarm 200 into two sub-swarms 410 and 420. These two sub-swarms 410 and 420 will have their respective temporary leaders 201 and 301 respectively. Referring to FIG. 4, Device 1 201 is the temporary leader of Swarm 1 410 and Device 5 301 is the temporary leader of Swarm 2 420. Further, the process of distributing the content to the next best suitable device in the two sub swarms may be repeated. Here, Device 2 401 is identified as the second best temporary leader in the sub swarm (Swarm 1) 410. Similarly, Device 6 403 is identified as the second best temporary leader in the sub swarm (Swarm 2) 420. The second best temporary leader may be identified based on the parameters associated with the temporary leader. The parameters may include ping response time, CPU utilization, available bandwidth and available memory of each of the devices in the respective sub swarm. The parameters may further include individual behavior of the devices in the sub swarm, device capability in the sub swarm, collective behavior of the sub swarm, interaction of devices with each other in the sub swarm. Identification of temporary leader is also based on consensus of the plurality of devices in the sub swarm.

Figure 5:
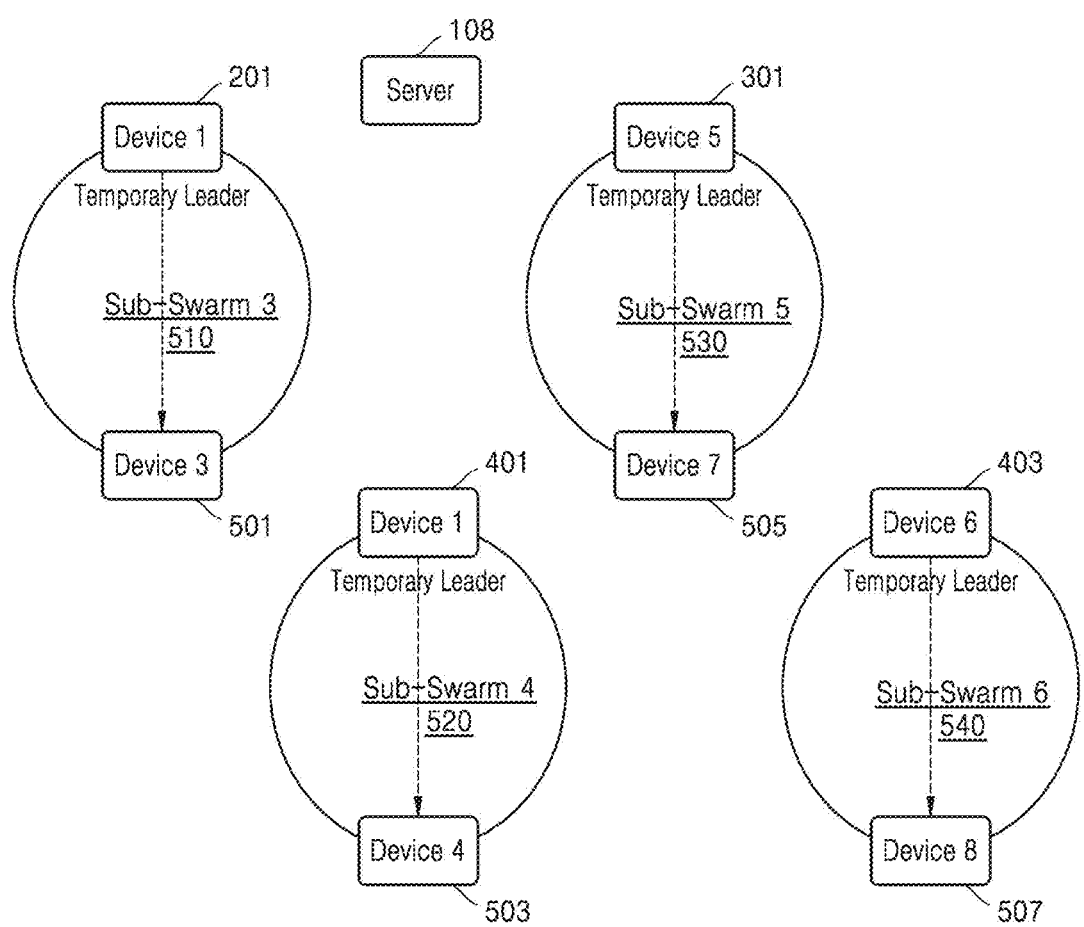
FIG. 5 illustrates dividing sub-swarms into the second depth sub-swarms, according to an embodiment of the disclosure.

FIG. 5 illustrates dividing sub-swarms into the second depth sub-swarms, according to an embodiment of the disclosure.

Referring to FIG. 5, sub-swarm 1 410 is divided into sub-swarm 3 510 and sub-swarm 4 520 having temporary leaders as Device 1 201 and Device 2 401 respectively. Also, sub-swarm 2 420 is divided into sub-swarm 5 530 and sub-swarm 6 540 as an event is generated due to more than one temporary leader in the sub-swarm 2 420. Since the sub-swarms 510, 520, 530 and 540 are generated from the sub-swarms (swarms 410 and 420) which are, so called the first depth sub-swarms, the sub-swarms 510, 520, 530 and 540 are called as the second depth sub-swarms. Here, Device 1 201 in the sub-swarm 3 510 distributes the content to Device 3 501. Likewise, in the sub-swarm 4 520, the Device 2 410 to Device 4 503, in the sub-swarm 5, Device 5 301 to Device 7 505, and in the sub-swarm 6, Device 6 403 distributes the content to Device 8 507, respectively.

Figure 6:
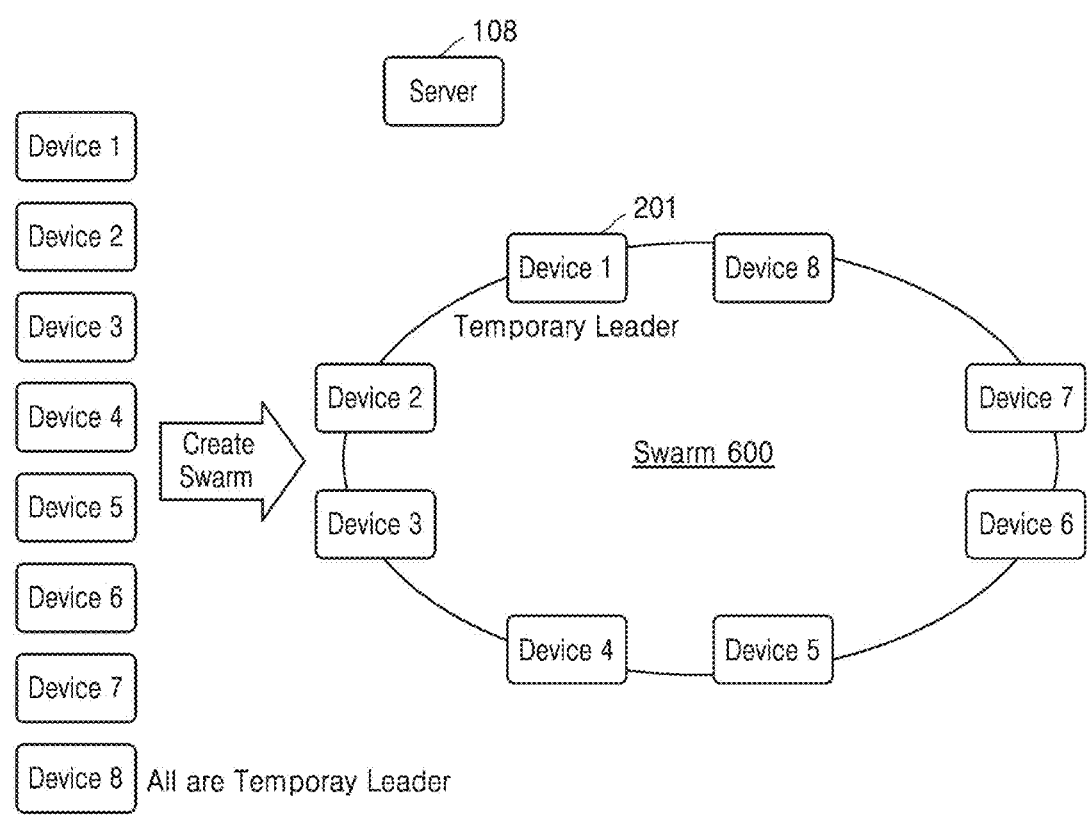
FIG. 6 illustrates creating a single swarm with a plurality of devices, according to an embodiment of the disclosure.

FIG. 6 illustrates creating a single swarm with a plurality of devices, according to an embodiment of the disclosure.

Referring to FIG. 6, all of the eight devices completed the downloading of the content and each of the eight devices become a temporary leader. This situation triggers an event and all the eight devices may forms one major swarm 600 back. The similar process of identifying a temporary leader, downloading and distributing second data among the eight devices in the major swarm 600, may be repeated. As shown in FIG. 6, the major swarm 600 is created, and Device 1 201 is identified as a temporary leader.

Figure 7:
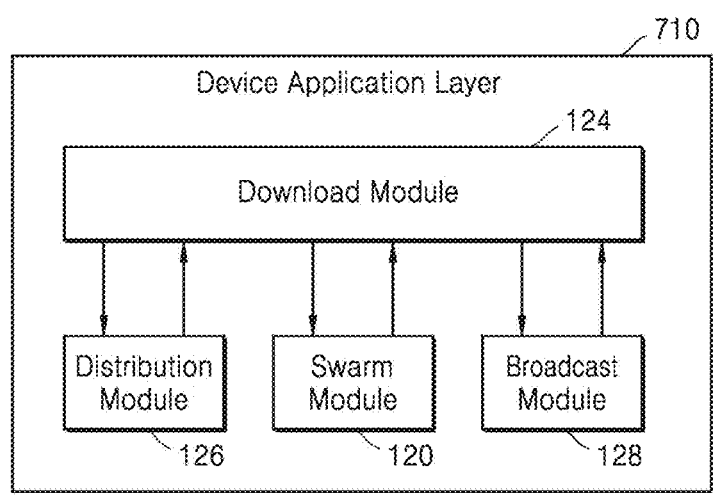
FIG. 7 illustrates a block diagram of the system used for downloading data, according to an embodiment of the disclosure.

FIG. 7 illustrates a block diagram of the system used for downloading data, according to an embodiment of the disclosure.

The disclosure includes various modules for performing various operations such as broadcasting data, creating/joining swarm, distributing data, and breaking into smaller swarms. The system 700 may be a standalone device, but the functionality of each of the devices depends upon other devices present in the network. In the system 700, a device application layer 710 has been disclosed. The device application layer 710 includes a swarm module 120, a broadcast module 128, a distribution module 126 and a download module 124. The swarm module 120 may be used to download data from the server 108 using swarm intelligence. The swarm intelligence in the devices is used with algorithms such as bee algorithm, artificial ant colony algorithm and so forth. The broadcast module 128 may be used to send, receive and process various information among the plurality of devices residing in the same network. The various information may include the swarm information, temporary leader information, load distribution information inside the network associated with a plurality of swarms or sub-swarms. The swarm information may include the size of the swarm (the number of nodes—devices—in the swarm), the identification of the swarm manager device (manger node) in the swarm, the identification of the devices included in the swarm, the availability of the devices in the swarm, the status of the devices in the swarm, and/or an event data of the swarm. The status of the devices may represent whether the devices are reachable by the swarm manager device in the swarm. The event data may include the types of anomalies and an occurrence time for each of the anomalies. The temporary leader information may include the identification of the temporary leader device, CPU capacity of the temporary leader device, and/or the bandwidth of the temporary leader device.

The distribution module 126 may be used to share the downloaded data using transport layer security (TLS) based TCP Server/Client for secure communication. Also, the download module 124 is used to maintain the flow from the beginning of operations and to check which module in the device application layer 710 initiated at what time.

Referring to in FIG. 7, the swarm module 120, the broadcast module 128 and the distribution module 126 communicate with the download module 124 to co-ordinate and manage the overall operations in the swarm.

Figure 8:
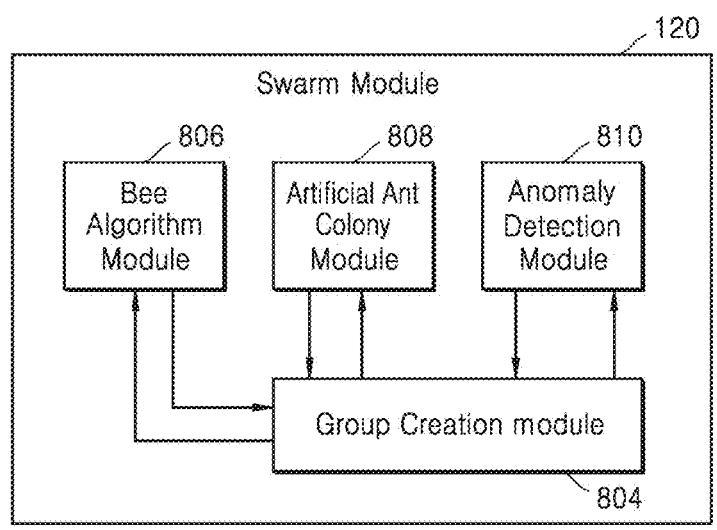
FIG. 8 illustrates a block diagram of the swarm module 120, according to an embodiment of the disclosure.

FIG. 8 illustrates a block diagram of the swarm module 120, according to an embodiment of the disclosure.

The swarm module 120 which is used to download the contents from a server using swarm intelligence may further include sub-modules such as a group creation module 804, a bee algorithm module 806, an artificial ant colony module 808, and an anomaly detection module 810.

Referring to FIG. 8, the bee algorithm module 806, the artificial ant colony module 808 and the anomaly detection module 810 are in communication with the group creation module 804. The anomaly detection module 810 may detect an event detected in a swarm. The term 'anomaly' may be used interchangeable with the term 'event' in the specification. The bee algorithm module 806 may be used to maintain information of each and every device in a swarm. To maintain the information, for example, a Patch Information Table (PIT) may be used. The information required to be maintained includes the temporary leader information, the content source information in case content is required at runtime of a device in the swarm, the key parameters required for making the swarm and identifying the temporary leader, the information of other devices for content distribution in case the device is a temporary leader. This information is considered useful when dividing the swarm dynamically and also when a different kind of events is generated such as a change in parameters which are set to check the deviation from current value.

Further, the group creation module 804 may be used to create or join a swarm based upon the parameters and the weight of the parameters. The group creation module 804 may be further used to decide whether to join a new swarm or to create a new swarm. This decision is made based upon the information received from Artificial Ant colony algorithm (unique string for behavior model) implemented in the Artificial Ant Colony module 808. The group creation module 804 may be used to wait for the response of the broadcast request via the download module 124 (not shown). In case the response is acceptable, then the group creation module 804 may update the information in the bee algorithm module 806 and join the swarm. In case the response is not acceptable, then the group creation module 804 may initialize the swarm manager to gather the device information of the joining devices and compute the information to determine the next best temporary leader in the swarm based on the bee algorithm module 806. Further, when an event is detected in the swarm, based upon the type of the event, the group creation module 804 may make the decisions of how the swarm will be divided into a plurality of sub-swarms and which temporary leader to join which sub-swarms when the swarm has more than one temporary leader. Upon the generation of the event, the group creation module 804 may gather the information of stored devices and check the information about the next best available temporary leader from the bee algorithm module 806. Based upon the ping response time, the group creation module 804 may select the group and update the information in PIT of the bee algorithm module 806.

Further, the artificial ant colony module 808 may create or determine to join the swarm whenever the device restarts its operations such as device boot up, download completion and the like. The artificial ant colony module 808 may further include a formula which is configured to generate a behavioral model of the devices in the swarm with the input parameters provided by the group creation module 804. Upon the generation of the unique string, the artificial ant colony module 808 may share the information with the download module 124 (not shown) for broadcasting the information and obtaining the result. If the result is positive, then the artificial ant colony module 808 may modify the device and the group creation module 804 may initialize the swarm manager and determine the device as the temporary leader device and upon receiving the request from other device, decide whether the device is eligible to join the swarm or not.

Further, the anomaly detection module 810 may detect the anomalies occurring in the swarm. The different types of anomalies may include more than one temporary leader inside a swarm, a change in the parameter chosen for creating the swarm or identifying the temporary leader, a request of content by a device during runtime of the device. On detecting such anomalies, the anomaly detection module 810 may initiate the group creation module 804 based upon the type of events. The group creation module 804 may either control a device to join the new swarm or to break the swarm into sub-swarms and identify a temporary leader based upon the information shared by anomaly detection module 810.

Figure 9:
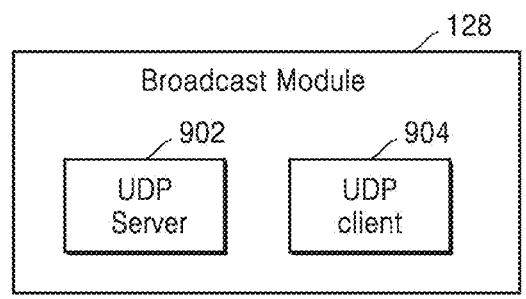
FIG. 9 illustrates a block diagram of the broadcasting module 128, according to an embodiment of the disclosure.

FIG. 9 illustrates a block diagram of the broadcasting module 128, according to an embodiment of the disclosure.

Referring to FIG. 9, the broadcast module 128 handles various information among the plurality of devices residing in the same network. The various information may include the swarm information, temporary leader information, and load distribution inside the network of plurality of swarms or sub-swarms. The broadcasting module 128 may further include sub-modules such as user datagram protocol (UDP) client 904 and UDP server 902. The UDP client 904 may broadcast public information only to the plurality of devices residing in the same network. The public information may be used for a swarm formation. The UDP client 904 may create the UDP-based client for broadcasting encrypted and reduced size information with the fixed bytes to the other devices residing in the same network. The encrypted information includes the behavioral model where a unique string is generated by the ant colony algorithm for creating the swarm based upon the input parameter provided by the group creation module 804 (not shown). The encrypted information may further include the temporary leader information. When a device joins the swarm or creates the swarm, the temporary leader information will be shared with each and every device in the swarm. In case the parameter related to identifying the temporary leader is changed, then the new updated information may be shared by the UDP client 904. The encrypted information may further include event information. Whenever any device in the swarm detects an event, then this event information may be shared with other devices via the UDP client 904 by sending the type of the event. Upon receiving the event information, the devices decide an action corresponding to the event. The encrypted information may further include a load distribution inside the swarms. When the swarm is divided into multiple sub-swarms, the temporary leader shares the load information with other devices in the swarm for parallel transmission of data in order to reduce the communication load on a router or the computation load inside the device.

Further, the UDP server 902 may receive the broadcast information and share the broadcast information with the download module 124 (not shown). This broadcast information may also be shared with the swarm module 120 (not shown) via the download module 124. Further, this broadcast information is decrypted and the type of information may be identified in the broadcast message. If the message is about joining the swarm, then this will be shared with the group creation module 804. If the message is about an event, then the anomaly detection module 810 may initiate actions corresponding to the type of detected event. Further, if the message is about the temporary leader information, then this information will be updated in the bee algorithm module 806.

Figure 10:
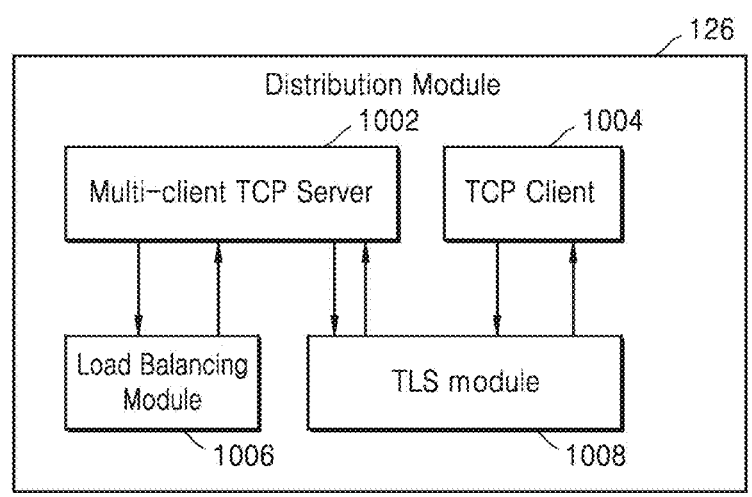
FIG. 10 illustrates a block diagram of the distribution module, according to an embodiment of the disclosure.

FIG. 10 illustrates a block diagram of the distribution module 126, according to an embodiment of the disclosure.

Referring to FIG. 10, the distribution module 126 may be initiated by the temporary leader in the swarm. Further, the distribution module 126 may share data using TLS based TCP Server/Client for secure communication. The plurality of devices use the TCP client connection for each and every content apart from the temporary leader. The temporary leader, as per initial information received for load balancing, allows a fixed number of parallel distribution of content. The distribution module 126 may further include sub-modules such as a TLS module 1008, a multi-client TCP server 1002, a TCP client 1004, and a load balancing module 1006. The TLS module 1008 may handle open SSL based communication and create the open SSL based sockets and a handshake between a client device and a server. If the handshake is successful, then the TLS module 1008 may proceed with the content distribution. The handshake process includes steps of sending a hello message to the server by the client device. In response to the hello message, the server sends the hello message and the certificate with a request for (client) certificate. Further, the client device verifies the client certificate and if the verification is successful, then the client device sends a secret key to the server which will be used for future communications. Further, if required, the server can ask for and verify the client certificate. If everything is acceptable, then both of the server and the client device start exchanging messages.

In an embodiment, the multi-client TCP server 1002 may create the multi-client TCP over the TLS using the TLS module 1008. The TLS module 1008 is used by the temporary leader in a swarm. The TLS module 1008 may transfer the content to the other devices in the swarm and maintain the load balance as per the assigned load value to the temporary leader. Further, the TCP client 1004 of the other devices in the swarm requests the temporary leader to fetch the content as per the requirement. As the maximum load is assigned to the temporary leader, the multi-client TCP server 1002 accepts connections for parallel download of content for fast distribution. If the request exceeds the load, then the multi-client TCP server 1002 responds back to the client device to wait for the queue to be empty for further connections.

The TCP client 1004 is created over the TLS and the TCP client 1004 fetches the content from temporary leader over the TLS. Once the event is generated or detected and the swarm is divided into sub-swarms, a device creates the TCP client 1004 and starts downloading the content. In this case, the device sends a SYN command to the server. On receiving the SYN command, the SYN command is checked to be verified. If the command is verified then the server sends an ACK message back to the device. Afterwards, a TLS handshake process takes place. If the handshake is successful, then the device fetches the content from the server.

In an embodiment, the load balancing module 1006 may maintain the load on the temporary leader. The load refers to the maximum parallel transaction. When the swarm is initially created, the swarm determines the maximum load on the temporary leader based upon the signal strength of a router. If the load increases at the temporary leader, then the load balancing module 1006 generates or detects an event which is sent to the device, then the device maintains the queue for downloading the content from the temporary leader. If possible, the swarm may be divided into sub-swarms to distribute the load.

Figure 11:
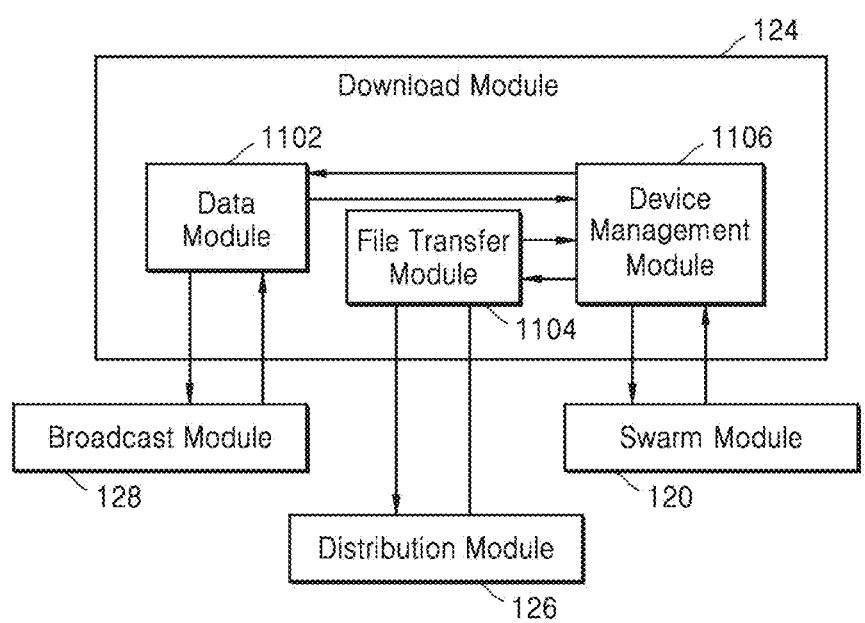
FIG. 11 illustrates a block diagram of the download module, according to an embodiment of the disclosure.

FIG. 11 illustrates a block diagram of a download module 124, according to an embodiment of the disclosure.

Referring to FIG. 11, the download module 124 may manage the entire process for downloading the contents from a server using swarm intelligence. The download module 124 may maintain the flow from the beginning and check which module initiates at what time. The download module 124 may include sub-modules such as a data module 1102, a file transfer module 1104 and a device management module 1106. The data module 1102 is configured to receive information shared by the broadcast module 128 or to check the information to be broadcasted using the broadcast module 128. This information is transferred to the device management module 1106 which is configured to perform action corresponding to the shared information by the data module 1102. Further, the data module 1102 holds the lifecycle for the broadcasting module 128 and whenever there is a notification at the data module 1102, it uses the UDP client 904 (not shown) to broadcast the information. If the device is a temporary leader, then this enables the TCP server 1002 over the TCP client 1004 (not shown to receive the download request from the devices. This information is further shared with the device management module 1106 for handling it properly.

Further, the file transfer module 1104 is configured to perform the file transfer operations. If the device is a temporary leader, then the file transfer module 1104 is configured to download the content from the server and to distribute the same using the distribution module 126. If the device is not a temporary leader, then the file transfer module 1104 is configured to fetch the content from the temporary leader using the distribution module 126 by creating a maximum number of clients for parallel distribution. Further, the file transfer module 1104 may be controlled by the device management module 1106. Also, the device management module 1106 notifies the file transfer module 1104 about the type of operation which the file transfer module 1104 has to follow. Further, the file transfer module 1104 is configured to maintain the maximum limit for the client operations. If the client operations exceed the maximum limit, then upon a detection of the event, the device decides whether to identify another temporary leader or to continue with the same temporary leader by maintaining the queue.

In an embodiment, the device management module 1106 is configured to maintain an appropriate flow from the beginning. Further, when the device boot up takes place or when the download and distribution is completed, then the device management module 1106 may use the swarm module 120 to create one major swarm and identify the temporary leader in the swarm. If an event is detected, then the device management module 1106 may divide the swarm into multiple sub-swarms and identify the temporary leader in the sub-swarm accordingly. This device acts as a swarm manager for the entire download and distribution operation. The device management module 1106 further follows a template pattern which is a step based design pattern. Hence, whenever an event is detected or there is any requirement of the device management module 1106, the device management module 1106 follows the standard design algorithm.

Figure 12:
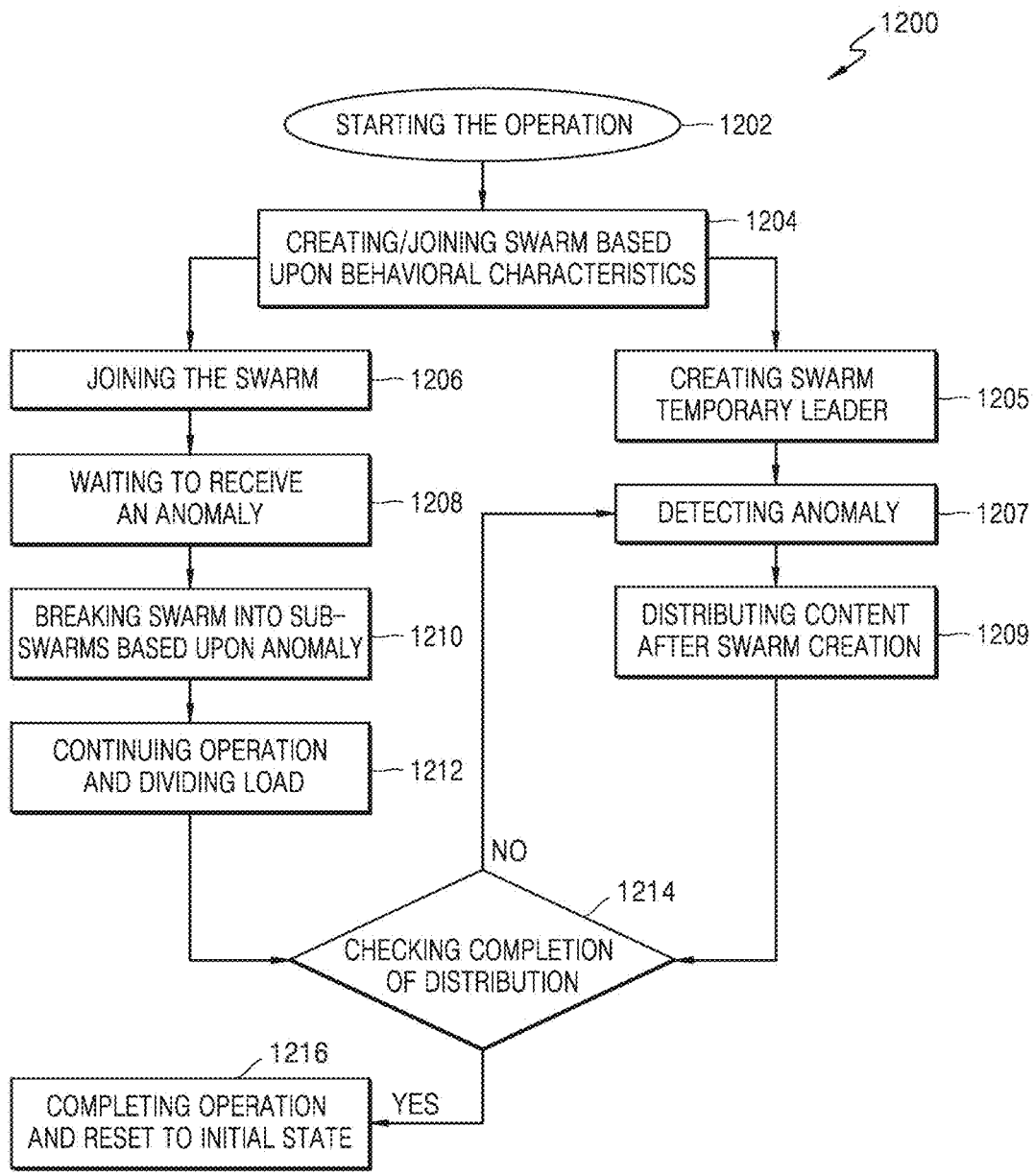
FIG. 12 is a flowchart illustrating a method of managing data in a network, according to an embodiment of the disclosure.

FIG. 12 is a flowchart 1200 illustrating a method of managing data in a network, according to an embodiment of the disclosure.

Referring to FIG. 12, in operation 1202, the operation of managing data in a network is started. In operation 1204, creating or joining the swarm including a plurality of client devices in a network is performed based on behavioral characteristics of the plurality of devices. The behavioral characteristics of the plurality of devices may include identification number, firmware identification, group identification, SSID and the like, where the group identification may include content ID, schedule ID, geographic location and the like.

In operation 1205, the swarm module 120 may create a swarm including a plurality of devices in the network based on the behavioral characteristics of the plurality of devices. A temporary leader may be determined in the swarm based on device parameters. In operation 1208, the swarm module 120 may wait until the occurrence of the event. If there is any kind of change in the selection parameters of the temporary leader in the plurality of devices, an event is generated or detected in operation 1207 and the plurality of devices in the swarm may update the temporary leader. In operation 1210, in response to the event, the current swarm is divided into at least two sub-swarms. In an embodiment, the distribution module 126 may divide the swarm into plurality of sub-swarms which have balanced characteristics in a dynamic manner.

Further, if the user tries to download data—e.g. content—from remote server, then the temporary leader downloads the content and distributes the data to the next best suitable temporary leader in the swarm in operation 1209. Once the distribution is completed, more than one temporary leader is identified in the swarm which generates an event and the swarm will be broken into at least two sub-swarms and the same process continues until all of the plurality of devices become a temporary leader or receive the data in operation 1212. It is checked whether the distribution of the data is completed in operation 1214. If the distribution of the data to all of the plurality of devices is not completed, the process proceeds back to operation 1207 where an event indicating that at least two temporary leaders are detected in one swarm.

Once the plurality of devices become temporary leader or the swarm contains only two devices, then another kind of the event—a completion of distribution of the data—is generated in operation 1214 and a single swarm containing the all of the plurality of devices is created in operation 1216. That is to say, in response to the completion of the data transmission, all of the plurality of devices may form a single swarm back.

Figure 13:
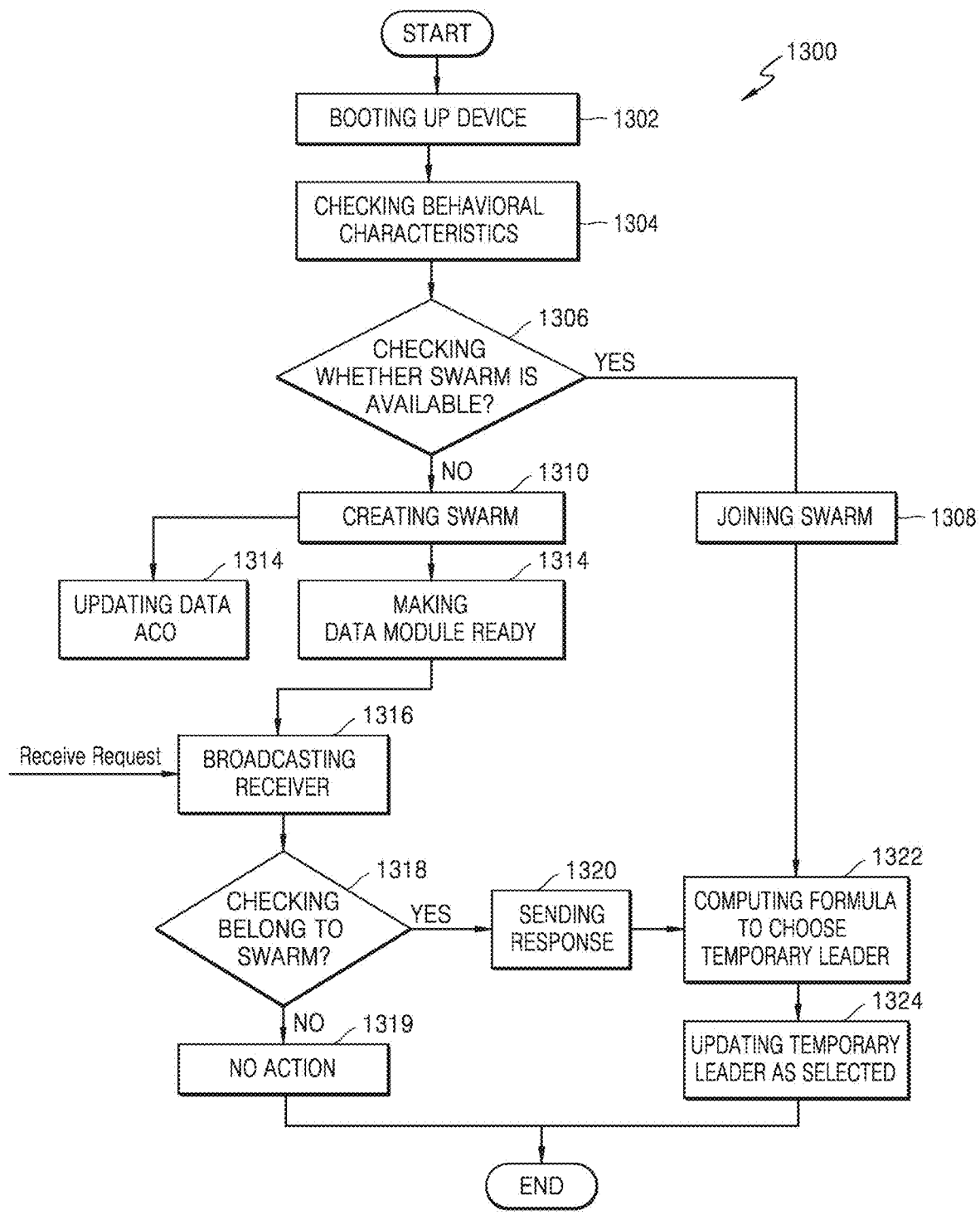
FIG. 13 is a flowchart illustrating a method of generating a swarm, according to an embodiment of the disclosure.

FIG. 13 is a flowchart 1300 illustrating a method of generating a swarm, according to an embodiment of the disclosure.

Referring to FIG. 13, upon booting up the device in operation 1302, the device management module 1106 may be initiated. In an embodiment, the device management module 1106 may check and/or compute behavioral characteristics of a plurality of devices in a network in operation and generates unique data—a unique string 1304 by using the following equation:

$$\text{String}=\text{ToUpper}(\text{md5}(\text{Firmware Version}+\text{Model Number}))$$ Equation 1

The md5( ) function calculates the MD5 hash of a string. Thus, md5(Firmware Version+Model Number) may calculate the hash from a string containing Firmware Version+Model Number. ToUpper( ) function is used to convert lowercase alphabet to uppercase.

In operation 1306, it is checked whether a swarm is available. The device management module 1106 further uses the data module 1102 to broadcast the data to other devices. Upon receiving of a response by the data module 1102 in a predetermined time, a device will join the swarm in operation 1308 if the swarm is determined to be available in operation 1306 or the device will create the swarm in operation 1310 if the swarm is determined to be unavailable. Next, the below formula will be computed for choosing a temporary leader in the swarm:

$$f(n)=\Sigma_{n=1}^{N}(P_n W_n)$$ Equation 2 where P is the device parameter and W is the weight.

In an embodiment, the device parameter in Equation 2 may include ping response time of each of the devices in the swarm, the memory capacity of each of the devices in the swarm, and/or the CPU capacity of each of the devices in the swarm. The CPU capacity may be the CPU speed or the CPU computation availability based on the CPU utilization. The weight may be assigned to in an order as follows: ping response time>CPU capacity>memory capacity. The value calculated under the Equation 2 becomes higher as faster the ping response time is and as larger the CPU capacity and the memory capacity are.

If the value calculated under the Equation 2 of the existing temporary leader in swarm is higher than the devices, then the device management module 1106 may update the information containing the value calculated under the Equation 2 to the Patch Info Table (PIT) and notify all other devices in the swarm. If a device in the swarm has higher value than the value of the temporary leader, then the device will update itself as a temporary leader and notify this information to all other devices in the swarm. If there is no response in predetermined time, then device may create a new swarm with itself as temporary leader and make the data module 1102 ready in operation 1314 to receive the request for the future and update the data in operation 1312 for the ant colony optimization approach of the swarm module 120. When the device receives the request to join the swarm, then the data module 1102 shares this information with the device management module 1106. In an embodiment, the device management module 1106 may verify through the ant colony optimization module whether this device belongs to the swarm or not in operation 1318. If yes, then the device sends the request back to the device in operation 1320 otherwise it will take no action in operation 1319. In operation 1322, the value of the devices under the Equation 2 is generated by computing the device parameters to choose a temporary leader in the swarm and the selected temporary leader may be updated in operation 1324.

Figure 14:
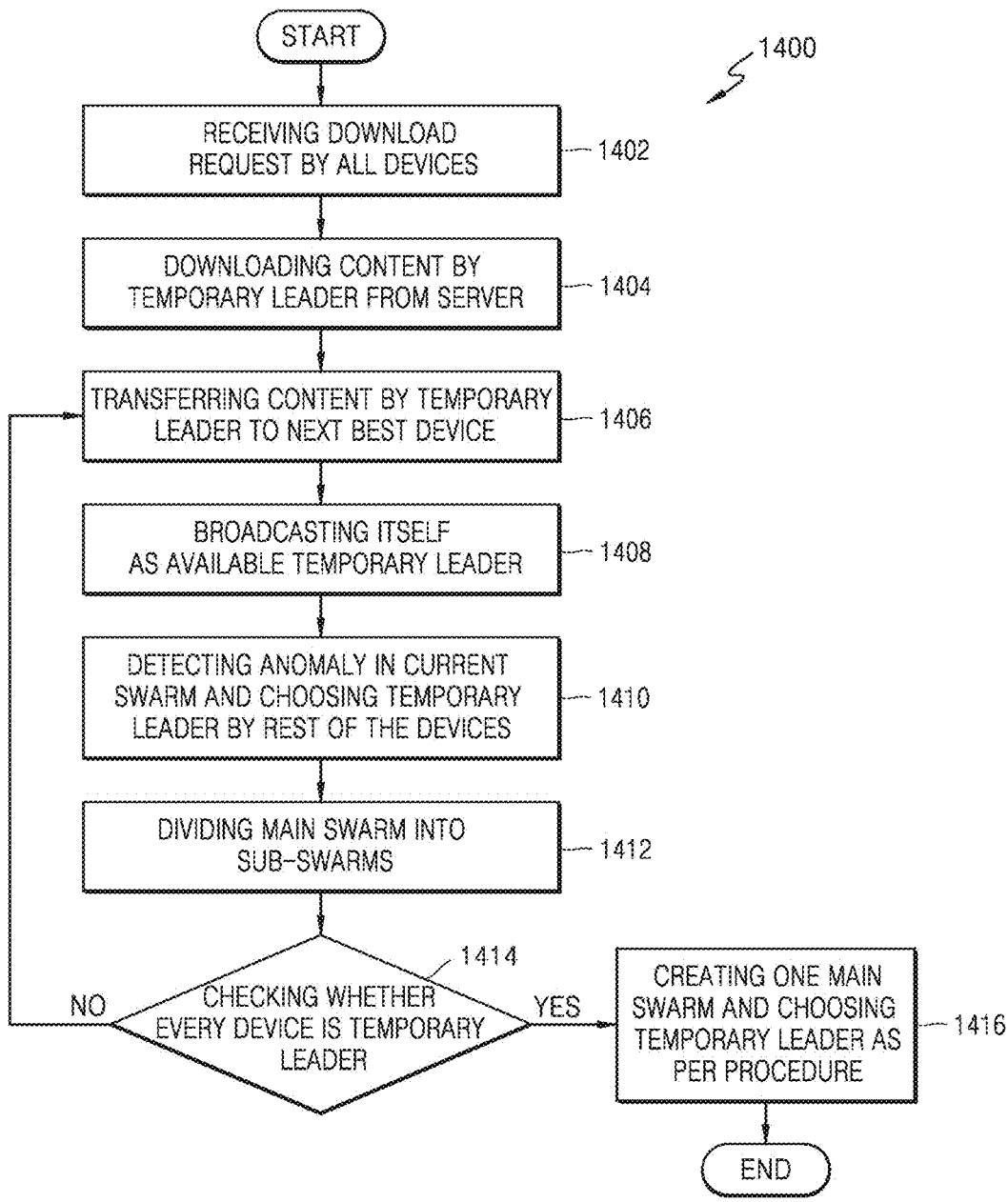
FIG. 14 is a flowchart illustrating a method of detecting an event in a swarm, according to an embodiment of the disclosure.

FIG. 14 is a flowchart 1400 illustrating a method of detecting an event in a swarm, according to an embodiment of the disclosure.

Upon a detection of an event such as a detection of more than one temporary leader in a swarm or a change in the parameter value used for creating the swarm, the device management module 1106 updates the behavior characteristics of the devices in the swarm in and every device identifies its own temporary leader based upon the value obtained from the Equation 2.

Referring to FIG. 14, the event may be generated when more than one temporary leader is detected after content distribution is completed. This event may be generated when the user requests to download data—the content from the server in operation 1402. On receiving the request, the temporary leader in the swarm downloads the data in operation 1404. After the temporary leader distributes the data to the next best available temporary leader which is determined under Equation 2 in operation 1406. Once the distribution is completed, then the next best available temporary leader will make itself as available temporary leader in the swarm in operation 1408. This situation will trigger an event as there are two temporary leaders in the swarm in operation 1410. Upon the generation of this event, the swarm is divided into two sub-swarms each of which has at least one temporary leader in operation 1412. This process will proceed resulting in logarithmic progression of distribution. This process will finish when each device will become a temporary leader in operation 1414. Then, an event is generated resulting in a formation of one major swarm including all of the devices in operation 1416. Using this procedure, the speed of downloading content in a group of devices significantly improves by log N and data consumption is reduced by N where N is the number of devices in the first generated swarm.

Figure 15:
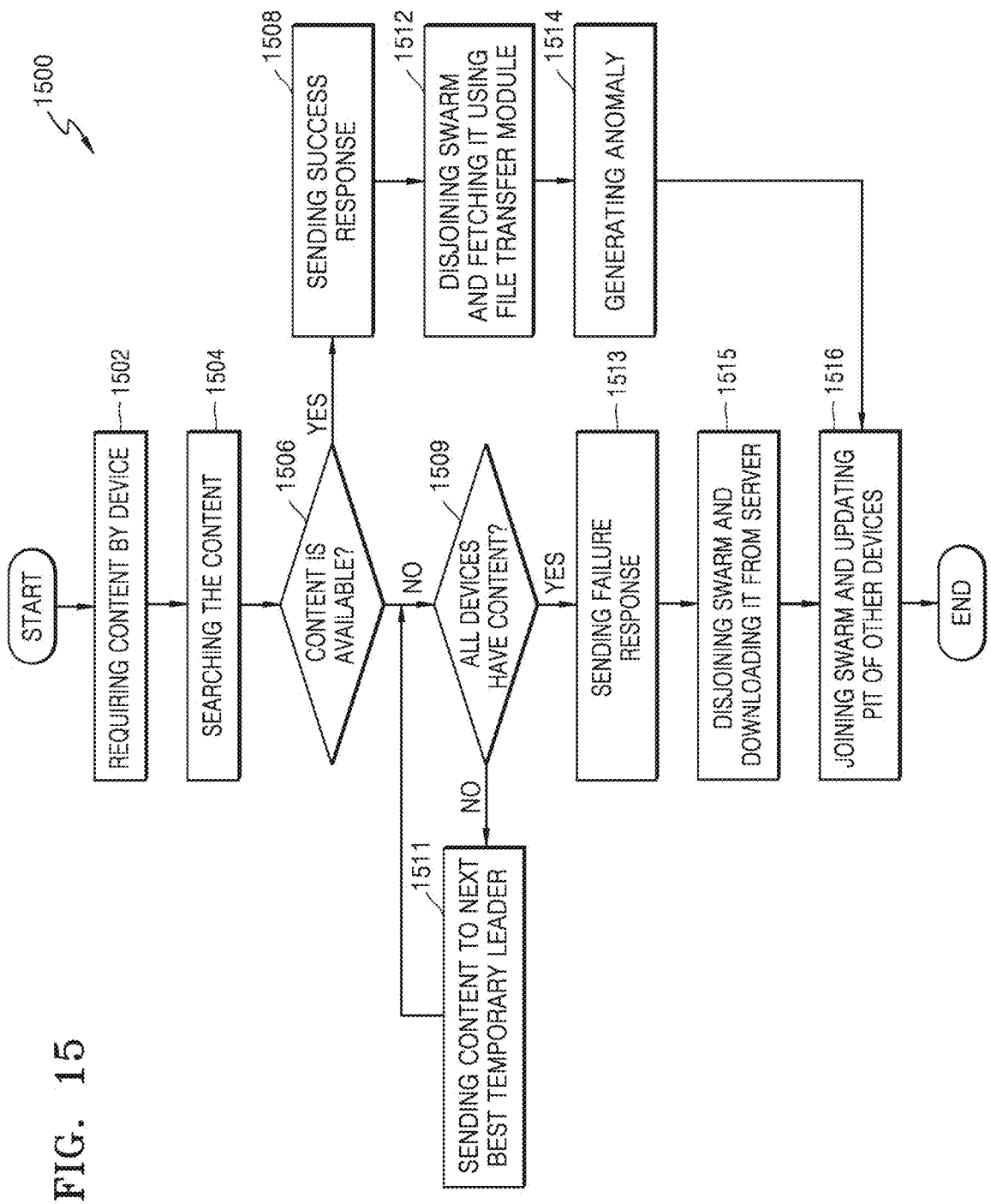
FIG. 15 is a flowchart illustrating a method of distributing content required at runtime, according to an embodiment of the disclosure.

FIG. 15 is a flowchart 1500 illustrating a method of distributing content required at runtime, according to an embodiment of the disclosure.

Referring to FIG. 15, the event of more than one temporary leader found in one swarm is detected when content is requested at runtime of a device in a network in operation 1502. In case any device requests content during runtime, the device searches for content on the temporary leader in operation 1504. If the temporary leader does not have the content, then the temporary leader may check whether the content is available among the devices in the swarm by notifying to the next best available temporary leader for the content in operation 1506.

If it is detected that the content is available among any device in the swarm, a success response is transmitted to the temporary leader in response to the notification in operation 1508. If the device other than the temporary leader has the content, then for time being this device will make itself as a temporary leader and this will create an event in the swarm. Upon generating the event, all other devices update the content information in the PIT using the bee algorithm of the swarm module 120 for future reference. Further, the main swarm is divided into two sub-swarms using the device management module 1106 which further uses the ant colony optimization algorithm Once the swarm formation is completed, the device fetches the content using the file transfer module 1104 in operation 1512. Once device obtains the content, the content receiving device becomes a temporary leader. When all the devices in the swarm become temporary leaders, this creates an event in operation 1514 and all the devices rejoin the one main swarm again in operation 1516.

If the content is not available in operation 1506, the process will repeat in operation 1511 until it is determined that no device in the swarm has the content in operation 1509. If it is determined that no device has the content, a failure response may be transmitted to the temporary leader in the swarm in operation 1513 and then the device will download the content from the server by detaching itself from the main swarm in operation 1515. Once the download is completed, the device will join the main swarm and send the content to all the devices in the swarm. All other devices update the content in the PIT using the bee algorithm for future reference in operation 1516.

Figure 16:
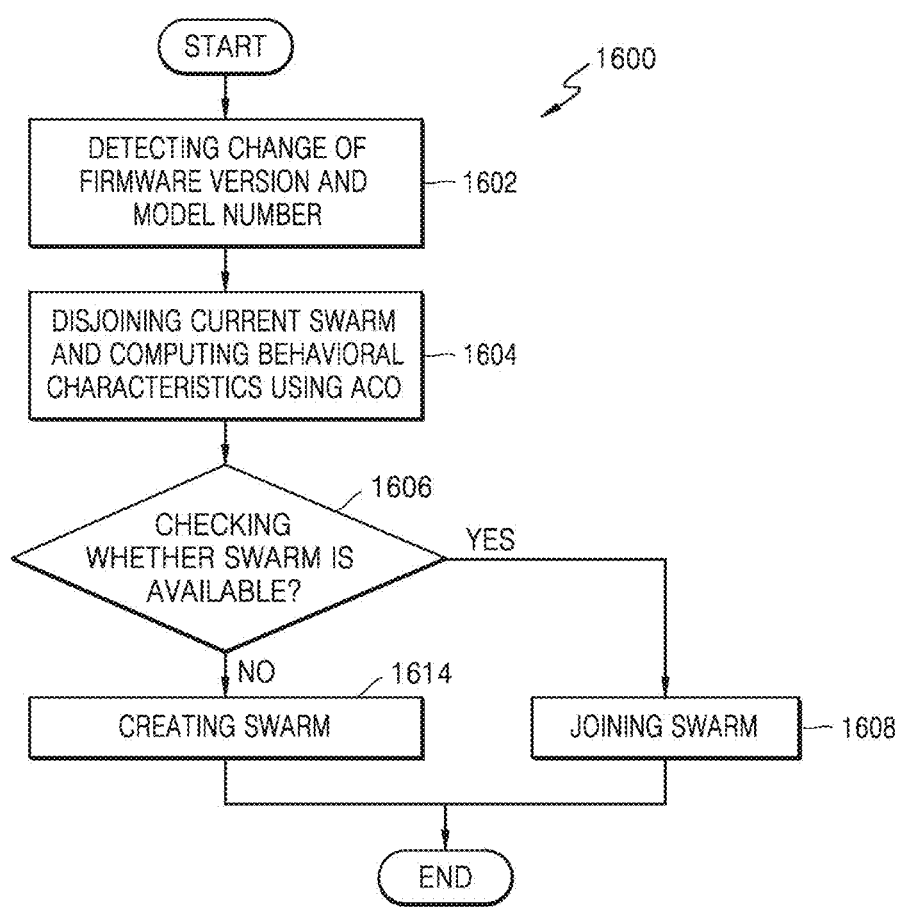
FIG. 16 is a flowchart illustrating a method of dynamically breaking a swarm into sub-swarms, according to an embodiment of the disclosure.

FIG. 16 is a flowchart 1600 illustrating a method of dynamically breaking a swarm into sub-swarms, according to an embodiment of the disclosure.

Referring to FIG. 16, an event is detected when a change in the parameter related to swarm creation is detected. In case one of the parameters related to the swarm creation is changed during runtime of a device, then that device updates the parameter in operation 1602. The parameters may include a firmware/software version or model number of the software/firmware used by the device. This parameter may be also called a swarm formation parameter. The change of the swarm formation parameters may generate an event, which results into disjoining from the current swarm and computing behavioral characteristics of the devices in operation 1604. If there is no swarm available based on checking of whether another swarm is available 1606, then a new swarm is created in operation 1614 or joining another swarm which is most suitable in operation 1608. This type of the event occurs when there is an update in software for that device. In this case, the firmware version is changed, and the swarm formation parameter is also changed, which results in joining to some other swarm or creating a new swarm.

Figure 17:
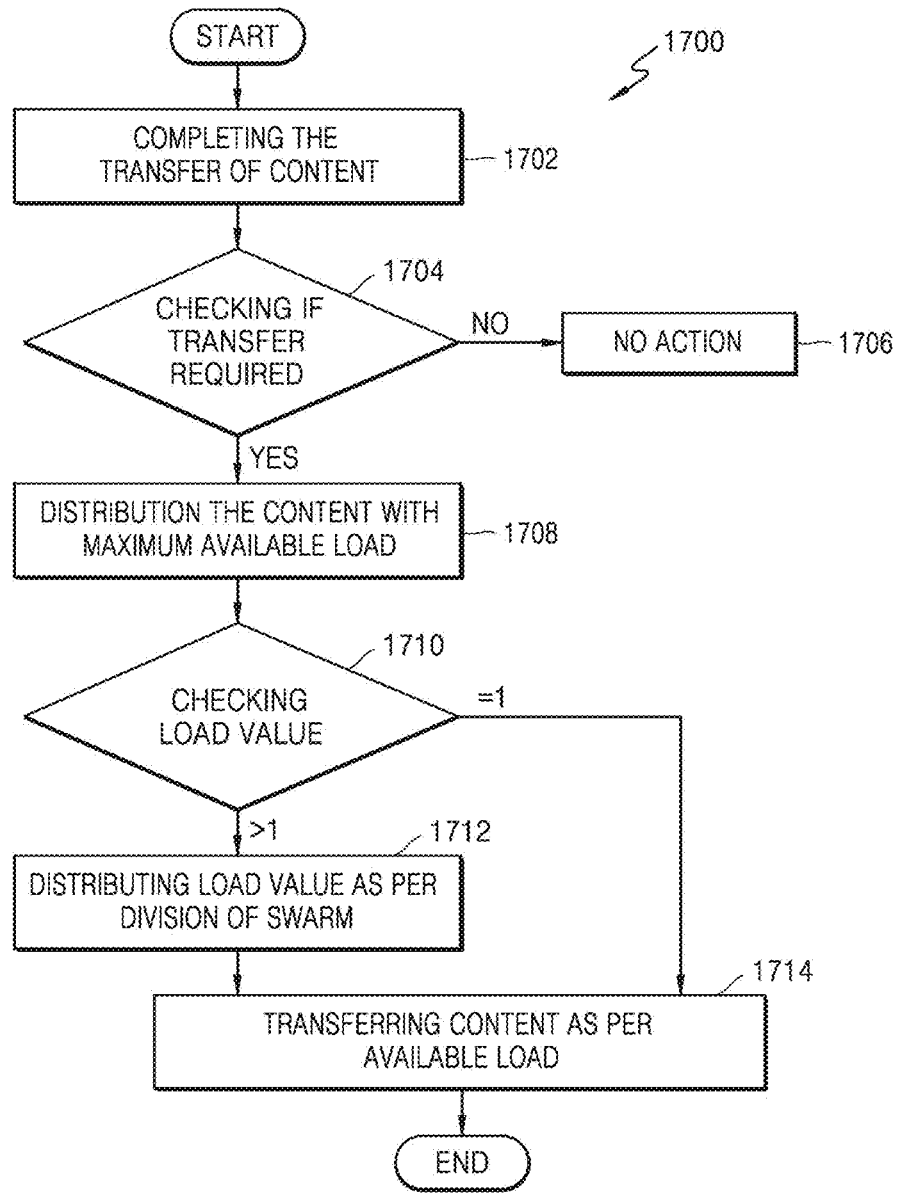
FIG. 17 is a flowchart illustrating a method of load balancing while transferring content, according to an embodiment of the disclosure.

FIG. 17 is a flowchart 1700 illustrating a method of load balancing while transferring content, according to an embodiment of the disclosure.

Referring to FIG. 17, while a temporary leader of the swarm is distributing the content to the next best suitable device, the temporary leader may have to restrict the maximum possible distributions during that time as the temporary leaders also get increase in the logarithmic progression for balanced load. Upon completing the transfer of the content in operation 1702, it is checked whether the transfer of the content is required in operation 1704. If not transfer is required, no action is performed in operation 1706.

If the transfer of the content is required, at the first instance, the temporary leader may distribute the content with maximum available load in operation 1708. Upon determining the maximum available load, the swarm is divided into sub-swarms as the load distribution also gets updated. The maximum available load is known to the temporary leaders. During the first instance, when the content distribution is completed and the distribution of sub-swarms is required, it is checked whether the load value exceeds 1 in operation 1710. If the load value exceeds 1, both of the temporary leaders distribute the load among themselves in operation 1712. Similarly, during the next distribution of content, the temporary leader considers the maximum load as the available load. This process is repeated on until the maximum load available for each device reaches to one per one distribution at a time in operation 1714. This approach reduces the congestion in the router so that if some other request is received on the router that should not be missed.

Figure 18:
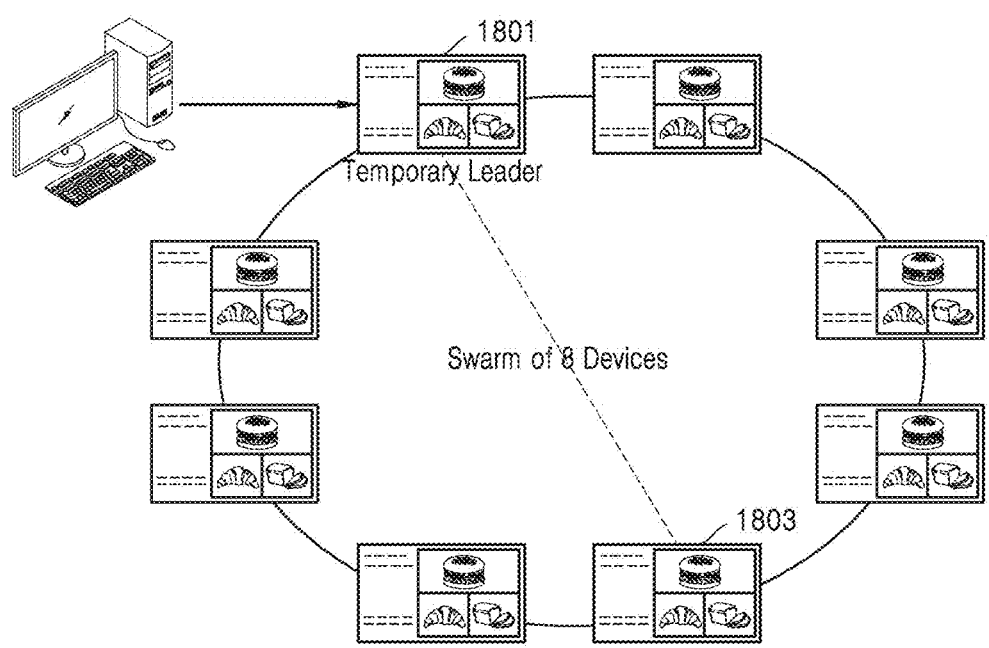
FIG. 18 illustrates distribution of content with a single swarm of a plurality of devices, according to an embodiment of the disclosure.

FIG. 18 illustrates a distribution of content with a single swarm of the plurality of devices, according to an embodiment of the disclosure.

Referring to FIG. 18, Mr. X runs a very successful food chain in a city. For his menu display, Mr. X wants to use the digital signage for better customer experience. Mr. X uses the 8 smart signage devices for this purpose. Mr. X has installed the server on his personal laptop. He also has Wi-Fi installed in his food chain restaurant. Mr. X has connected all his eight devices to the Wi-Fi router in order to use them in the network mode. All the devices are approved on the same group on the server. This router is also being used by the customers as service and also by Mr. X for his work.

Further, Mr. X creates a content using tool on his laptop for Monday special menu and uploads the menu on the server. The size of the content is 550 MB. He then creates a schedule and publishes the schedule to the group which consists of all the eight devices. The data consumed for Mr. X is 4.4 GB (550 MB*8) and downloading this amount of data consumes lot of time as bandwidth for download is limited. The waiting time is also increased to get the content deploy on the screens. Further, Mr. X also has to again deploy the schedule for Tuesday menu specials and data consumption will become higher and deployment will be done at much slower speed.

However, if all the devices are connected to Wi-Fi router by using swarm intelligence, one best device is identified as a temporary leader 1801. This identified temporary leader requests for downloading of content from the server. When the schedule is requested to download from the server, the temporary leader device downloads the contents from server and distributes the content to next best temporary leader 1803 in the swarm. Then swarm will be divided into sub swarms with one temporary leader 1801 which distributes the content in the sub swarm. The next best temporary leader 1803 will distribute the content in another sub swarm. This process will continue until all the devices has the content. In the foregoing scenario, Mr. X's data consumption will be 550 MB and the distribution of the content will be performed at much faster speed.

Figure 19A:
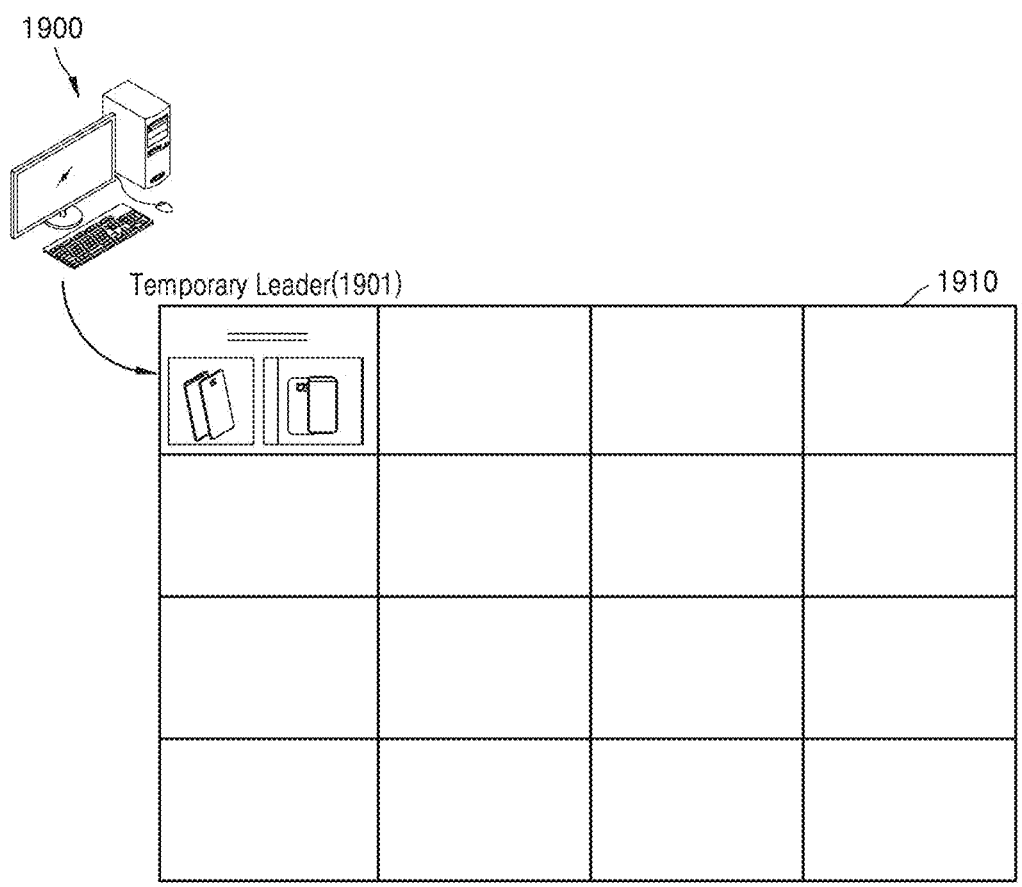
FIG. 19A illustrates a use case of a video wall, according to an embodiment of the disclosure.

FIG. 19A illustrates a use case of a video wall, according to an embodiment of the disclosure.

Referring to FIG. 19A, the server 1900 transmits content with a displaying schedule to a temporary leader 1901 of the video wall 1910.

Figure 19B:
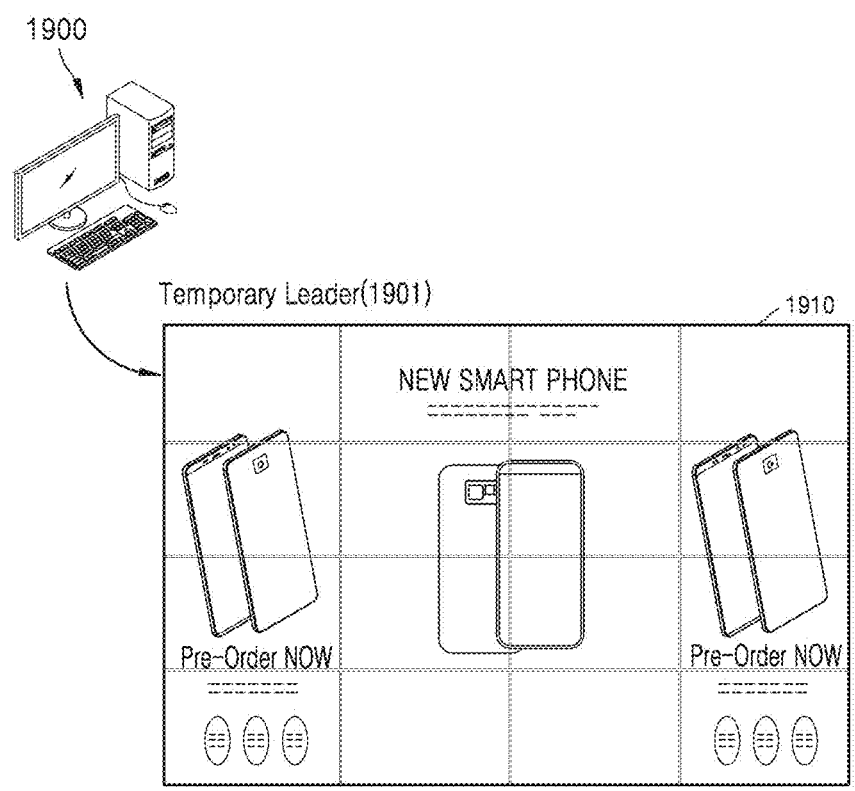
FIG. 19B illustrates a video wall when the content downloading is completed, according to an embodiment of the disclosure.

FIG. 19B illustrates a video wall when the content downloading is completed, according to an embodiment of the disclosure.

Referring to FIG. 19B, Mr. X creates a 4×4 video wall for advertisement purpose. Mr. X also creates a video wall schedule on the server 1900 and transmits the schedule—the display schedule for each of the devices in the swarm—to the video wall. Now, the content for the video wall is downloaded by the temporary leader. After completing the download, the temporary leader distributes the required content to the next best temporary leader and each device gets the content with the display schedule from the server. The schedule may be created by one of the devices in the swarm to be specifically applicable to the swarm. For example, the schedule may take into account the number of the devices in the swarm and/or location of each of the devices in the video wall. If the content is a moving picture, the schedule may also include time information related to the content for each of the devices in the swarm. Once the content is distributed using swarm intelligence, all the devices display its own the content based on the display schedule. Referring to FIG. 19B, although all the devices in the swarm may obtain the same content, each of the devices may display differently to form the video wall 1910—a video advertisement—based on the display schedule. To accomplish proper displaying of the content with the devices forming the video wall 1910, the display schedule may contain the display format matching the location or the time information in the video wall 1910. As a result, based on the display schedule, each of the devices may display at least a part of the video advertisements respectively.

The swarm intelligence for distributing content may be also applicable to On-Demand Video service as follows. Assuming that Mr. X wants to see a movie with Video-On-Demand service provided by a service provider. As Mr. X's TV is included in a swarm of the society he lives in, using the swarm intelligence according to the disclosure, the information table—e.g. EPG—within the TV is checked for the available nodes—devices—in the swarm. If one node has the required content, the TV will fetch the content from the node. This method saves the data consumed and increases speed for Mr. X's TV.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification of the embodiments as described herein.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method of managing data in a network, the method comprising:
   identifying a first leader device and a second leader device from among a plurality of devices in a swarm comprising the plurality of devices, based on device parameters of the plurality of devices;
   receiving a request for downloading data;
   downloading, by the first leader device, the data from a content device in response to the request;
   transmitting, by the first leader device, the data to the second leader device; and
   dividing the swarm into a first sub swarm comprising the first leader device and a second sub swarm comprising the second leader device.

2. The method of claim 1, wherein the second leader device transmits the data received from the first leader device to at least one device included in the second sub swarm.

3. The method of claim 2, wherein, upon the transmitting of the data by the first leader device to the second leader device, the second sub swarm is divided into a third sub swarm comprising the second leader device and a fourth sub swarm comprising the at least one device of the plurality of devices.

4. The method of claim 1, further comprising:
   determining the swarm comprising the plurality of devices in the network based on behavior characteristics of the plurality of devices.

5. The method of claim 4, wherein the determining of the swarm comprising the plurality of devices in the network comprises:
   detecting the behavior characteristics of the plurality of devices;
   generating information on the behavior characteristics for each of the plurality of devices; and
   broadcasting the information on the behavior characteristics over the network.

6. The method of claim 4, wherein the behavior characteristics of the plurality of devices comprise at least one of identification number of the plurality of devices, firmware identification in the plurality of devices, group identification to which the plurality of devices belong, or service set identifier (SSID) of the plurality of devices.

7. The method of claim 1, wherein the device parameters comprise at least one of ping response time of the plurality of devices, bandwidth of the plurality of devices, CPU capacity of the plurality of devices or memory capacity of the plurality of devices.

8. The method of claim 1, wherein the identifying of the first leader device and the second leader device is based on a priority of the device parameters associated with the plurality of devices.

9. The method of claim 8, further comprising:
   determining the priority of the device parameters based on at least one of ping response time of the plurality of devices, CPU capacity of the plurality of devices, bandwidth of the plurality of devices, or memory capacity of the plurality of devices.

10. The method of claim 1, further comprising:
    detecting a change in a swarm formation parameter;
    disjoining a selected device from the swarm in response to the detecting of the change in the swarm formation parameter; and
    joining the selected device to another swarm.

11. The method of claim 10, wherein the swarm formation parameter comprises at least one of software version of the first leader device or firmware version of the first leader device.

12. The method of claim 1, further comprising detecting an event in the swarm.

13. The method of claim 12, wherein the event comprises at least one of an existence of two or more leader devices in the swarm, a change of the parameter chosen for generating the swarm or for choosing at least one leader device, a completion of the transmission of the data at the second leader device, or a request of data by a device during runtime in the swarm.

14. The method of claim 12, further comprising:
    in response to the detecting of the event, based on an event type of the event, joining to another swarm or generating a sub swarm from the swarm; and
    controlling to select a new leader device in the sub swarm when the sub swarm is generated,
    wherein the number of devices in the sub swarm is smaller than the number of devices in the swarm, when the sub swarm is generated.

15. The method of claim 1, wherein the data comprises content and schedule data which is used to instructs each of the plurality of devices in the swarm to display a part of the content based on location of each of the plurality of devices in the swarm.

16. The method of claim 15, wherein the schedule data further includes time information related to the content if the content is a moving picture.

17. An apparatus for managing data in a network, the apparatus comprising:
a memory; and
a processor configured to:
  identify a first leader device and a second leader device from among a plurality of devices in a swarm comprising the plurality of devices, based device parameters of the plurality of devices,
  receive a request for downloading data,
  download, by the first leader device, the data from a content device in response to the request,
  store the downloaded data to the memory,
  transmit the data to the second leader device, and
  divide the swarm into a first sub swarm comprising the first leader device and a second sub swarm comprising the second leader device.

* * * * *